US 6,538,846 B1

(12) United States Patent
Sato

(10) Patent No.: US 6,538,846 B1
(45) Date of Patent: Mar. 25, 2003

(54) THIN-FILM MAGNETIC HEAD AND METHOD FOR MAKING THE SAME

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 86 days.

(21) Appl. No.: 09/632,450

(22) Filed: Aug. 4, 2000

(30) Foreign Application Priority Data

Aug. 6, 1999 (JP) ............................................. 11-223821

(51) Int. Cl.⁷ .................................................. G11B 5/147
(52) U.S. Cl. ....................................................... 360/126
(58) Field of Search ................................ 360/126, 125, 360/119, 120, 110, 123

(56) References Cited

U.S. PATENT DOCUMENTS

| 4,241,367 A | * | 12/1980 | Nomura et al. ............... 360/123 |
| 5,282,308 A | * | 2/1994 | Chen et al. ................. 29/603.18 |
| 5,452,164 A | | 9/1995 | Cole et al. ................... 360/317 |
| 5,649,351 A | | 7/1997 | Cole et al. ................. 29/603.14 |
| 5,652,687 A | | 7/1997 | Chen et al. ................... 360/126 |
| 5,802,700 A | | 9/1998 | Chen et al. ................. 29/603.14 |
| 6,012,218 A | * | 1/2000 | Shimizu et al. ............. 29/603.14 |
| 6,185,068 B1 | * | 2/2001 | Fujita et al. ................. 360/123 |
| 6,204,997 B1 | * | 3/2001 | Sasaki ........................ 360/123 |
| 6,246,541 B1 | * | 6/2001 | Furuichi et al. ............. 360/123 |
| 6,317,288 B1 | * | 11/2001 | Sasaki ........................ 360/126 |
| 6,353,511 B1 | * | 3/2002 | Shi et al. .................... 360/126 |
| 2001/0009488 A1 | * | 7/2001 | Sato ........................... 360/126 |
| 2001/0026419 A1 | * | 10/2001 | Watanabe et al. ........... 360/126 |
| 2001/0043433 A1 | * | 11/2001 | Kanada et al. .............. 360/120 |
| 2002/0018317 A1 | * | 2/2002 | Sato et al. .................. 360/126 |
| 2002/0018318 A1 | * | 2/2002 | Narumi et al. .............. 360/126 |
| 2002/0030928 A1 | * | 3/2002 | Hsiao et al. ................. 360/123 |

* cited by examiner

Primary Examiner—Brian E. Miller
Assistant Examiner—Julie Anne Watko
(74) Attorney, Agent, or Firm—Brinks Hofer Gilson & Lione

(57) ABSTRACT

A thin-film magnetic head has a lower core layer, an upper core layer, a track width defining portion, and a first coil layer. The first coil layer has a spiral conductive pattern with a predetermined number of turns. The track width defining portion includes a gap layer and at least one of optional upper and lower magnetic pole layers. The first coil layer is provided behind the track width defining portion in the height direction. The upper face of the first coil layer is aligned in a reference plane defined by the interface between the track width defining portion and the upper core layer. The thin-film magnetic head has a decreased magnetic path length and exhibits decreased inductance.

43 Claims, 9 Drawing Sheets

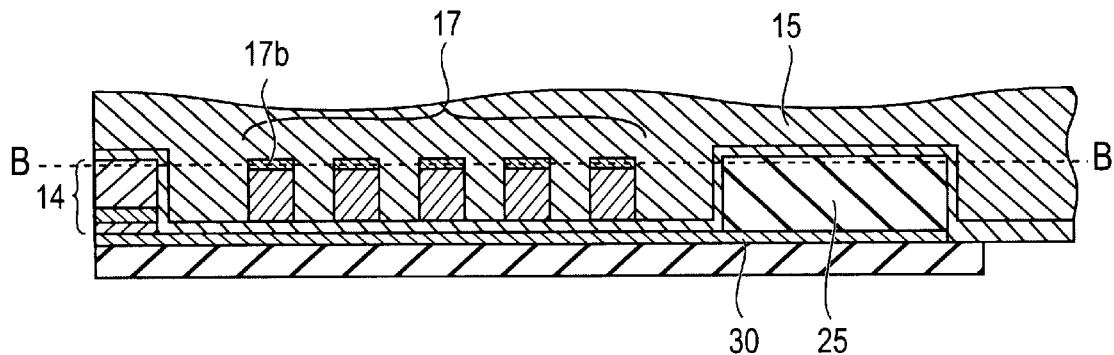
FIG. 7
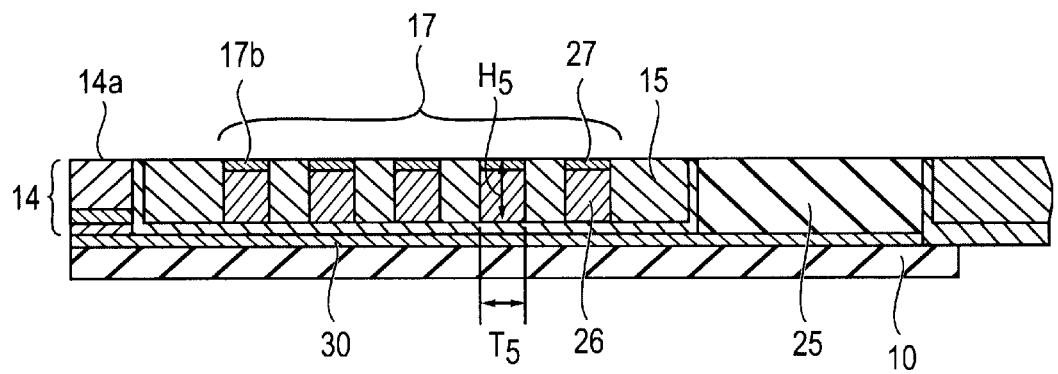
FIG. 8
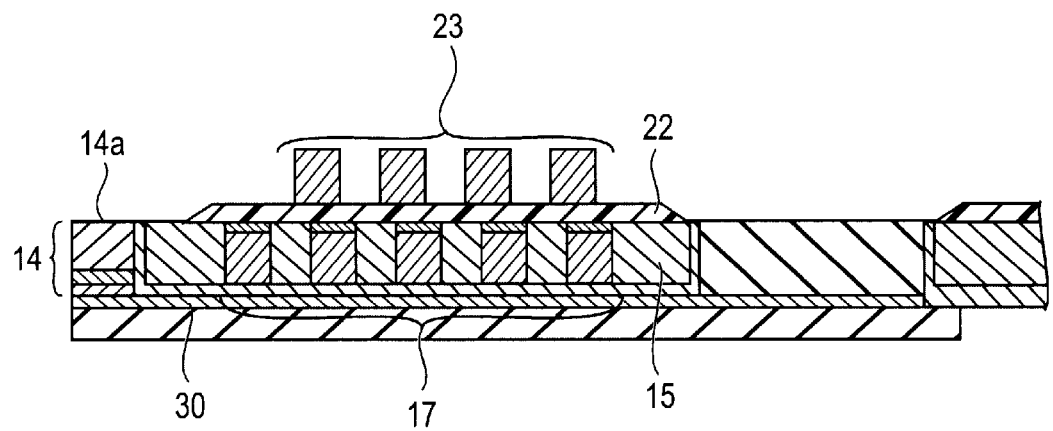
FIG. 9
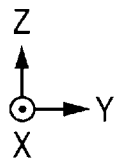

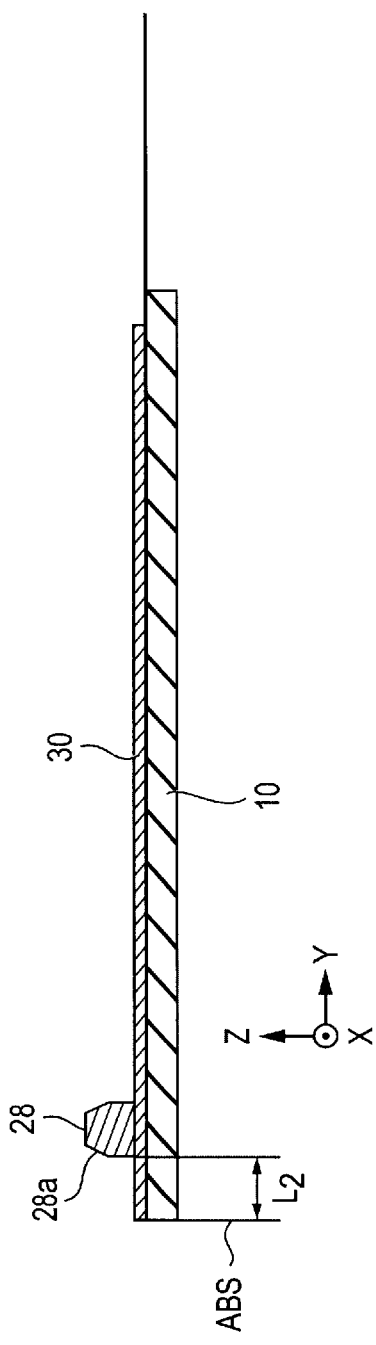
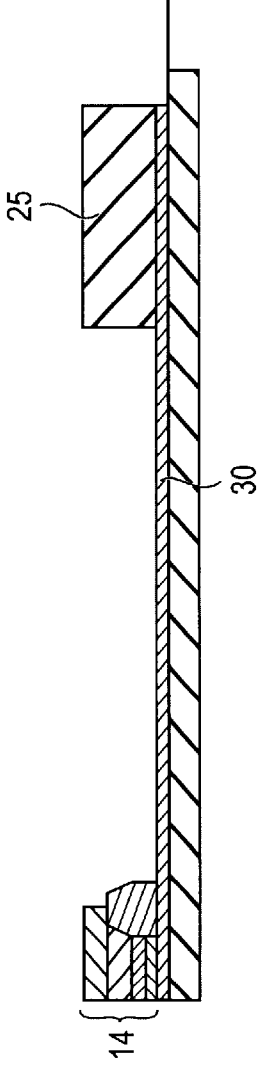
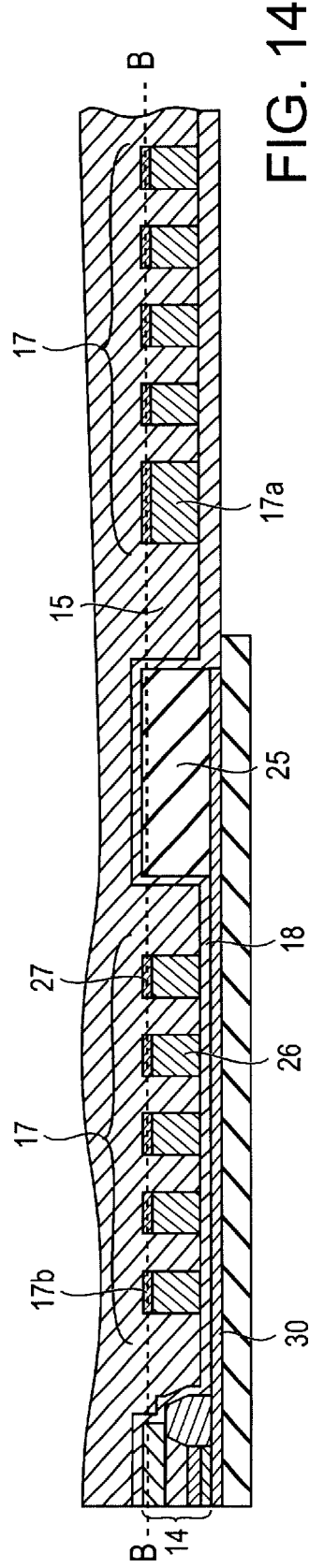

THIN-FILM MAGNETIC HEAD AND METHOD FOR MAKING THE SAME

BACKGROUND OF THE INVENTION

1. Field of the Invention

The present invention relates to thin-film magnetic writing heads used in, for example, floating magnetic heads. In particular, the present invention relates to a thin-film magnetic head having reduced inductance suitable for high recording densities and to a method for making the thin-film magnetic head.

2. Description of the Related Art

FIG. 18 is a partial front view of a conventional thin-film magnetic head (inductive head). FIG. 19 is a partial cross-sectional view taken along line XIX—XIX and viewed from arrows in FIG. 18.

The thin-film magnetic head has a lower core layer 1 formed of a magnetic material such as permalloy, and an insulating layer 9 formed thereon. The insulating layer 9 has a groove 9a which extends from a face opposing a recording medium (hereinafter referred to as ABS (air bearing surface)) in the height direction (Y direction in the drawings) and has a track width $T_w$. A lower magnetic pole layer 3 magnetically coupled with the lower core layer 1, a gap layer 4, and an upper magnetic pole layer 5 are formed in that order by plating in the groove 9a. As shown in FIG. 19, a coil layer 7 having a spiral pattern is provided on the insulating layer 9 behind the groove 9a in the height direction (Y direction in the drawing). The coil layer 7 is covered with a coil insulating layer 8 composed of, for example, a resist. An upper core layer 6 is formed on the coil insulating layer 8. The upper core layer 6 is magnetically coupled with the upper magnetic pole layer 5 at a leading end 6a and with the lower core layer 1 at a base portion 6b.

In the inductive head shown in FIGS. 18 and 19, a recording current applied to the coil layer 7 induces recording magnetic fields in the lower core layer 1 and the upper core layer 6. These recording magnetic fields generate a fringing magnetic field between the lower magnetic pole layer 3 magnetically coupled with the lower core layer 1 and the upper magnetic pole layer 5 magnetically coupled with the upper core layer 6. The fringing magnetic field records magnetic signals on a recording medium such as a hard disk.

In this inductive head, the lower magnetic pole layer 3, the gap layer 4, and the upper magnetic pole layer 5 have a track width $T_w$. This inductive head is suitable for narrow tracks at the ABS.

A method for making the inductive head will be described. The insulating layer 9 is formed on the lower core layer 1, the groove 9a having the track width $T_w$ and a predetermined length is formed in the insulating layer 9 in the height direction from the ABS. The lower magnetic pole layer 3, the gap layer 4, and the upper magnetic pole layer 5 are formed by plating in that order in the groove 9a, and the coil layer 7 is formed by patterning on the insulating layer 9 behind the groove 9a.

The coil layer 7 is covered with the coil insulating layer 8. The upper core layer 6 is formed by a frame plating process over the upper magnetic pole layer 5 and the coil insulating layer 8. The inductive head shown in FIGS. 18 and 19 is thereby completed.

Trends toward narrower track widths accompanying high recording densities and high recording frequencies require reduced inductance of inductive heads. The reduced inductance requires a reduced magnetic path length, which is formed from the lower core layer 1 to the upper core layer 6. Thus, the width $T_1$ of the coil layer 7 lying from the leading end 6a to the base portion 6b must be decreased. By decreasing the width $T_1$ of the coil layer 7, the length of the upper core layer 6 is also decreased, and thus the magnetic path length is decreased.

A possible solution for decreasing the width $T_1$ of the coil layer 7 without changing the number of turns of the coil layer 7 is to use a double-layer structure for the coil layer 7. However, in the structure of the thin-film magnetic head shown in FIGS. 18 and 19, the magnetic path length cannot be decreased to a level suitable for future higher recording frequencies even if the coil layer 7 has a double-layer structure. As a result, the inductance cannot be reduced to a required level.

The reason for the above insufficiently reduced inductance is that the coil layer 7 is formed on the thick insulating layer 9. As shown in FIG. 18, the insulating layer 9 has a thickness $H_5$, which is larger than the total thickness $H_6$ of the lower magnetic pole layer 3, the gap layer 4, and the upper magnetic pole layer 5. Thus, the coil layer 7 on the insulating layer 9 lies, as shown in FIG. 19, above a reference plane between the upper magnetic pole layer 5 and the upper core layer 6, that is, the coil layer 7 is shifted toward the upper core layer 6.

When the coil layer 7 has a double-layer structure, the height from the upper face of the lower core layer 1 to the upper face of the coil insulating layer 8 becomes significantly large regardless of a decreased width $T_1$ of the coil layer 7. Accordingly, the magnetic path length is not decreased as expected, and the inductance is not decreased to a required level.

Moreover, the double-layer configuration of the coil layer 7 inevitably causes an increased thickness $H_1$ of the coil insulating layer 8 covering the coil layer 7. The protrusion of the coil insulating layer 8 from the reference plane is significant. Thus, the pattern of the upper core layer 6 is not readily formed by a frame plating process over the upper magnetic pole layer 5 and the coil insulating layer 8. As a result, the upper core layer 6 cannot be formed to a predetermined shape, particularly in the vicinity of the leading end 6a.

When the width $T_2$ of each conductive turn of the coil layer 7 is reduced and the thickness $H_2$ of each conductive turn is increased, the volume of the coil layer 7 does not vary. Thus, the width $T_2$ of each conductive turn can be reduced without increased coil resistance. Thus, the overall width $T_1$ of the coil layer 7 can be reduced so that the magnetic path length is further decreased. As a result, inductance is further reduced.

However, since the thickness $H_2$ of each conductive turn is increased, the protrusion of the coil insulating layer 8 covering the coil layer 7 is more significant. Thus, the upper core layer 6 cannot be formed into a required pattern.

SUMMARY OF THE INVENTION

Accordingly, it is an object of the present invention to provide a thin-film magnetic head having reduced inductance by a narrow track and a decreased magnetic path length and a method for making the thin-film magnetic head.

A thin-film magnetic head in accordance with the present invention includes a lower core layer, an upper core layer, a track width defining portion, and a first coil layer. The lower core layer may have an optional lower magnetic pole layer thereon. The upper core layer may have an optional upper magnetic pole layer thereunder. The track width defining portion defines a size in a track width direction disposed between the lower core layer and the upper core layer at a face opposing a recording medium the air bearing surface (ABS). The first coil layer induces recording magnetic fields in the lower core layer and the upper core layer. The first coil layer has a spiral conductive pattern with a predetermined number of turns. The track width defining portion includes a gap layer and at least one of the lower and upper magnetic pole layers. The lower magnetic pole layer is in contact with the lower core layer. The upper magnetic pole layer is in contact with the upper core layer. The gap layer is provided between the lower core layer and the upper core layer for insulating the lower core layer and the upper core layer. The first coil layer is provided behind the track width defining portion in a height direction. The upper face of the first coil layer is aligned in a reference plane defined by the interface between the track width defining portion and the upper core layer. A gap between turns of the spiral conductive pattern of the first coil layer is filled with a lower first-coil insulating layer. An upper first-coil insulating layer is formed on the first coil layer. Moreover, the upper core layer is provided over the track width defining portion to the upper first-coil insulating layer. The base portion of the upper core layer is magnetically coupled with the lower core layer.

In the present invention, the first coil layer is formed at a position which differs from the position of a coil in a conventional thin-film magnetic head to decrease the magnetic path length and thus decrease inductance. Accordingly, the thin-film magnetic head is suitable for future higher recording densities and higher recording frequencies.

The first coil layer is disposed behind the track width defining portion in the height direction. The surface of the first coil layer is aligned in the reference plane defined by the interface between the track width defining portion and the upper core layer. That is, the first coil layer is formed at a lower position compared to a conventional thin-film magnetic head. The height from the upper face of the lower core layer to the upper face of the upper coil-insulating layer is decreased. Thus, the length of the upper core layer is decreased, resulting in a decreased magnetic path length and decreased inductance.

Since the upper face of the first coil layer is aligned in the reference plane, the thickness of the first coil layer can be maximized. Thus, the width of the spiral conductor of the first coil layer can be reduced depending on the thickness without increasing the resistance. Moreover, the increased thickness contributes to a decreased magnetic path length and decreased inductance.

Preferably, the first coil layer comprises a conductive layer and a protective layer provided thereon. The top surface of the protective layer is aligned in the reference plane.

Since the protective layer can protect the conductive layer of the first coil layer from oxidation, the resistance of the first coil layer is maintained at a predetermined value.

Preferably, the conductive layer comprises at least one nonmagnetic conductive layer including at least one element of Cu and Au. The protective layer comprises at least one nonmagnetic conductive layer including at least one element selected from the group consisting of Ni, P, Pd, Pt, B, Au, and W.

Preferably, the lower first-coil insulating layer comprises an inorganic material.

Preferably, the thin-film magnetic head further includes a second coil layer on the upper first-coil insulating layer and a second-coil insulating layer for covering the second coil layer. The second coil layer is electrically connected to the first coil layer. The upper core layer is formed over the track width defining portion to the second-coil insulating layer. This configuration facilitates a further reduction in the width of the coil layers. As a result, the inductance is further decreased due to the further decreased magnetic path length.

Preferably, the upper face of a first coil center of the first coil layer is aligned in the reference plane and the first coil center of the first coil layer is electrically connected to a second coil center of the second coil layer.

Preferably, the gap layer comprises a nonmagnetic metal material formable by plating. In this case, the nonmagnetic metal material preferably comprises at least one material selected from the group consisting of NiP, NiPd, NiW, NiMo, NiRh, Au, Pt, Rh, Pd, Ru, and Cr.

A method for making a thin-film magnetic head in accordance with the present invention is described.

In the first step, a track width defining portion is formed on a lower core layer. The track width defining portion includes one of the following combinations: (1) the lower magnetic pole layer, the nonmagnetic gap layer, and the upper magnetic pole layer; (2) the lower magnetic pole layer and the nonmagnetic gap layer; and (3) the nonmagnetic gap layer and the upper magnetic pole layer. The track width defining portion has a predetermined length from a face opposing a recording medium (ABS) in the height direction.

In the second step, an insulating underlayer is formed on the lower core layer behind the track width defining portion in the height direction. A first coil layer is formed on the insulating underlayer.

In the third step, a lower first-coil insulating layer is formed and covers the track width defining portion and the first coil layer.

In the fourth step, the upper face of the lower first-coil insulating layer is planarized. The upper face of the track width defining portion and the upper face of the first coil layer are in the same plane and are exposed from the surface of the lower first-coil insulating layer.

In the fifth step, an upper first-coil insulating layer is formed on the exposed first coil layer.

In the sixth step, an upper core layer is formed the track width defining portion to the upper first-coil insulating layer.

In this method according to the present invention, the track width defining portion including the magnetic pole layer and the gap layer is formed on the lower core layer at the face opposing the recording medium (ABS) at a predetermined length in the height direction. Thus, the insulating layer 9 shown in FIGS. 18 and 19 is not present behind the track width defining portion. The lower core layer can be formed on the thin insulating underlayer provided on the lower core layer behind the track width defining portion. Consequently, the height from the upper face of the lower core layer to the upper face of the coil layer can be decreased. Accordingly, the thin-film magnetic head exhibits decreased inductance due to a decreased magnetic path length.

In this method, the first coil layer is formed on the insulating underlayer by patterning up to a position which is higher than the upper face of the track width defining portion after the upper face of the lower first coil insulating layer is planarized, then the lower first-coil insulating layer is polished by a CMP (chemical-mechanical polishing) process to expose the track width defining portion and the upper face of the coil layer. According to this method, the thickness of the first coil layer can be maximized. Thus, the width of the first coil layer can be reduced to decrease the magnetic path length without increased resistance.

Preferably, the first coil layer comprises a coil layer and a protective layer formed thereon. The protective layer is exposed from the lower first-coil insulating layer when the upper face of the lower first coil insulating layer is planarized.

Preferably, the conductive layer comprises at least one nonmagnetic conductive layer including at least one element of Cu and Au. The protective layer comprises at least one nonmagnetic conductive layer including at least one element selected from the group consisting of Ni, P, Pd, Pt, B, Au, and W.

Preferably, an inorganic insulating layer is formed as the lower first-coil insulating layer. Preferably, the track width defining portion, the first coil layer, and the inorganic insulating layer are planarized so that these layers are alinged in the same plane.

Preferably, the method further includes a step of forming a second coil layer electrically connected to the first coil layer and forming a second-coil insulating layer on the second coil layer after the upper first-coil insulating layer is formed. Preferably, the upper core layer is formed on the upper first-coil insulating layer covering the second coil layer. This configuration facilitates a further reduction in the width of the coil layers. As a result, the inductance is further decreased due to the further decreased magnetic path length.

Preferably, when the upper face of the lower first-coil insulating layer is planarized, a coil center of the first coil layer is exposed. A coil center of the second coil layer is deposited on the first coil center.

Preferably, when the track width defining portion is formed, the gap layer is formed together with at least one of the upper and lower magnetic pole layers by plating. In this case, the gap layer preferably comprises at least one material selected from the group consisting of NiP, NiPd, NiW, NiMo, Au, Pt, Rh, Pd, Ru, and Cr.

BRIEF DESCRIPTION OF THE DRAWINGS

FIG. 7 is a cross-sectional view showing the formation of the lower first-coil insulating layer for making the thin-film magnetic head in FIG. 2;

FIG. 8 is a cross-sectional view showing the results from polishing the lower first-coil insulating layer of the thin film magnetic head in FIG. 2;

FIG. 9 is a cross-sectional view showing the formation of upper coil layer for making the thin film magnetic head in FIG. 2;

FIG. 12 is a cross-sectional view showing the formation of layers for making the thin-film magnetic head shown in FIG. 3;

FIG. 13 is a cross-sectional view showing the formation of the track width defining the back gap layers for making the thin-film magnetic head in FIG. 3;

FIG. 14 is a cross-sectional view showing the formation of the lower coil layer for making the thin film magnetic head in FIG. 3;

DESCRIPTION OF THE PREFERRED EMBODIMENTS

Figure 1:
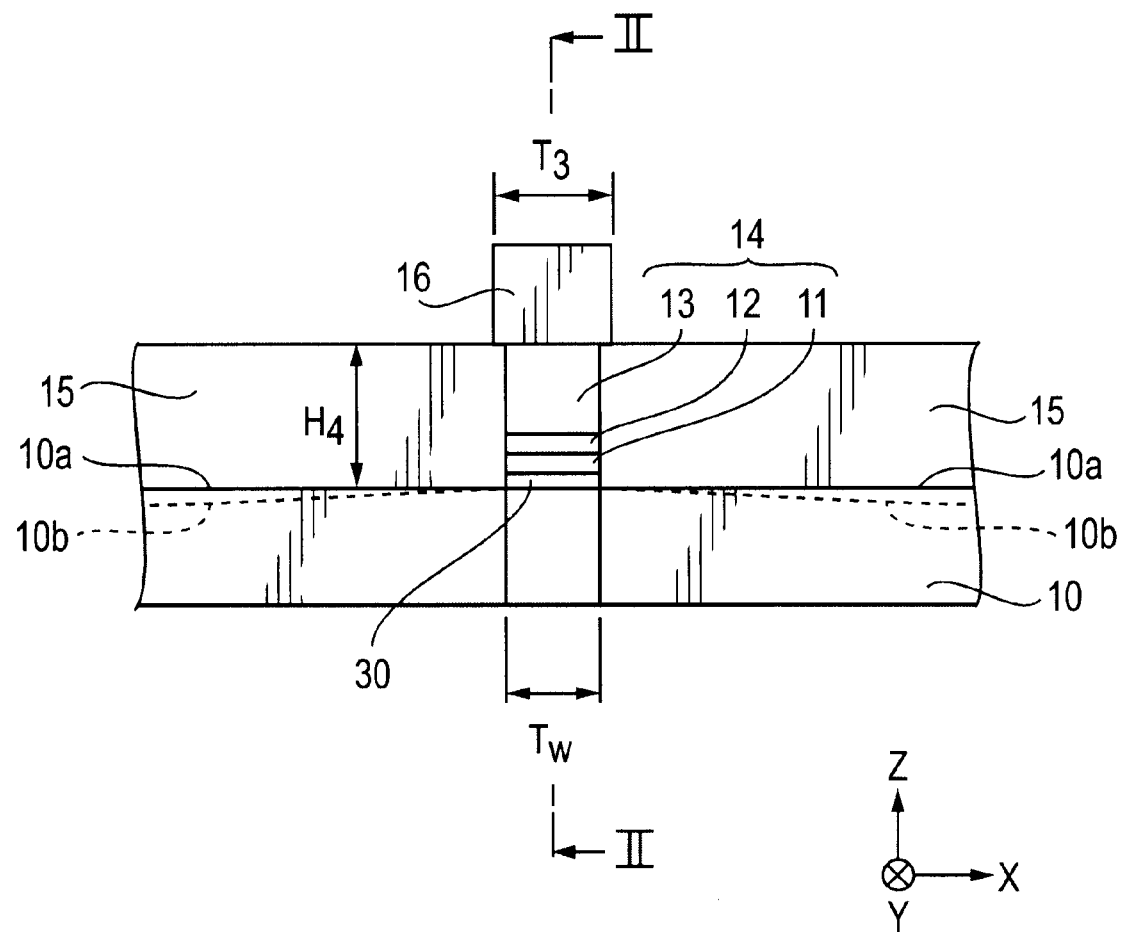
FIG. 1 is a partial front view of a thin-film magnetic head in accordance with a first embodiment of the present invention.
Figure 2:
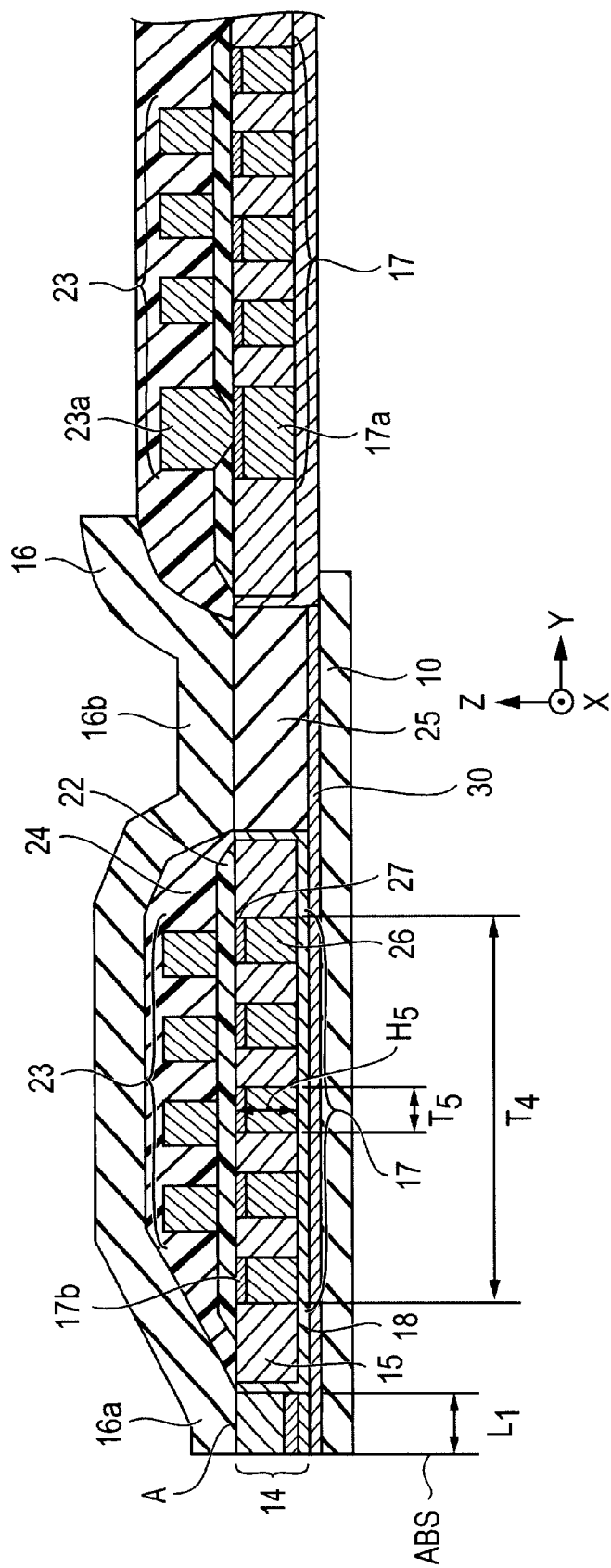
FIG. 2 is a partial cross-sectional view of the thin-film magnetic head taken along line II—II in FIG. 1.

FIG. 1 is a partial front view of a thin-film magnetic head in accordance with a first embodiment of the present invention; FIG. 2 is a partial cross-sectional view of the thin-film magnetic head taken along line II—II and viewed from arrows in FIG. 1. The thin-film magnetic head shown in FIG. 1 is an inductive head for recording. In the present invention, a read head (MR head) exhibiting a magnetoresistive effect may be deposited below the inductive head.

With reference to FIGS. 1 and 2, the inductive head includes a lower core layer 10 composed of a magnetic material such as permalloy. When a read head is provided below the lower core layer 10, a shielding layer may be provided in addition to the lower core layer 10 to protect the magnetoresistive element from noise. Alternatively, the lower core layer 10 may be used as an upper shielding layer for the read head without an additional shielding layer.

As shown in FIG. 1, the lower core layer 10 extends from a base end of a lower magnetic pole layer 11 to both sides in the track width direction (X direction in the drawing). The lower core layer 10 has a flat top surface 10a or more preferably sloping surfaces 10b sloping downward from the base end to both sides. The sloping surfaces 10b can more effectively prevent write fringing.

A track width defining portion 14 having a track width $T_w$ is formed on the lower core layer 10. The track width $T_w$ is preferably not more than 0.7 μm and more preferably not more than 0.5 μm. The thin-film magnetic head having such a track width $T_w$ is suitable for narrower tracks.

In the embodiment shown in FIGS. 1 and 2, the track width defining portion 14 has a triple-layered composite structure including the lower magnetic pole layer 11, a gap layer 12, and an upper magnetic pole layer 13.

The lower magnetic pole layer 11 is formed by plating on the lower core layer 10 and is the bottommost layer in the track width defining portion 14. The lower magnetic pole layer 11 is magnetically coupled with the lower core layer 10. The lower magnetic pole layer 11 and the lower core layer 10 may be composed of the same material or different materials. These layers may have single-layer or multi-layer configurations.

Preferably, the gap layer 12 is composed of a nonmagnetic metal material and is formed by plating on the lower magnetic pole layer 11. In the present invention, the nonmagnetic metal material is preferably composed of at least one material selected from the group consisting of NiP, NiPd, NiW, NiMo, NiRh, Au, Pt, Rh, Pd, Ru, and Cr. The gap layer 12 may have a single-layer configuration or a multi-layer configuration.

The upper magnetic pole layer 13 is formed by plating on the gap layer 12 and is magnetically coupled with an upper core layer 16 described below. The upper magnetic pole layer 13 and the upper core layer 16 may be composed of the same material or different materials, and may have single-layer configurations or multi-layer configurations.

When the gap layer 12 is formed of a nonmagnetic metal material, the lower magnetic pole layer 11, the gap layer 12, and the upper magnetic pole layer 13 can be continuously formed by plating.

The track width defining portion 14 can have other configurations, as long as the track width defining portion 14 includes the gap layer 12 and at least one of the lower magnetic pole layer 11 coupled with the lower core layer 10 and the upper magnetic pole layer 13 coupled with the upper core layer 16. The gap layer 12 magnetically insulates the upper magnetic layer(s), which includes the upper core layer 16, from the lower magnetic layer(s), which includes the lower core layer 10.

It is preferable that the lower and upper magnetic pole layers 11 and 13 facing the gap layer 12 have saturation magnetic flux densities which are higher than the saturation magnetic flux densities of the magnetically coupled lower and upper core layers 10 and 16. In this case, a recording magnetic field can be concentrated in the vicinity of the gap, and thus the recording density is improved.

With reference to FIG. 1, the track width defining portion 14 has a thickness $H_4$. In a preferred embodiment, the lower magnetic pole layer 11 has a thickness of approximately 0.4 $\mu$m, the gap layer 12 has a thickness of approximately 0.2 $\mu$m, and the upper magnetic pole layer 13 has a thickness of approximately 2 $\mu$m.

With reference to FIG. 2, the track width defining portion 14 has a length $L_1$ from a face opposing a recording medium (the air bearing surface (ABS)) in the height direction (Y direction in the drawing). The length $L_1$ defines a gap depth Gd. The gap depth Gd significantly affects electrical characteristics of the thin-film magnetic head and has a predetermined length.

As shown in FIG. 1, a lower first-coil insulating layer 15 is formed on both sides of the track width defining portion 14 and above the lower core layer 10. The lower first-coil insulating layer 15 is exposed at the face opposing the recording medium (ABS). The lower-first-coil insulating layer 15 fills a gap between turns of a spiral conductive pattern of a first coil layer 17 which is provided behind the track width defining portion 14 in the height direction (Y direction in the drawing). The lower first-coil insulating layer 15 has a function which is different from the function of the insulating layer 9 of the conventional thin-film magnetic head shown in FIG. 18.

Figure 18:
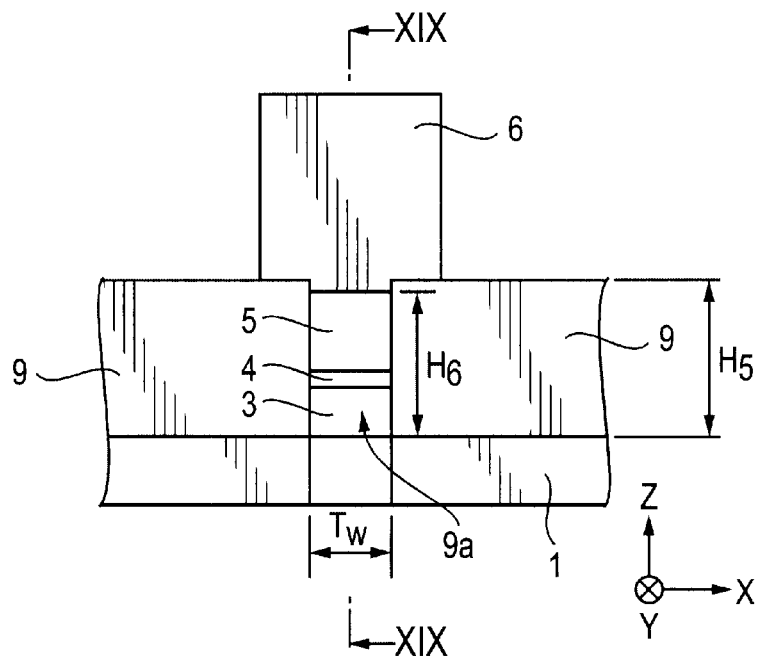
FIG. 18 is a partial front view of a conventional thin-film magnetic head according to the prior art.
Figure 19:
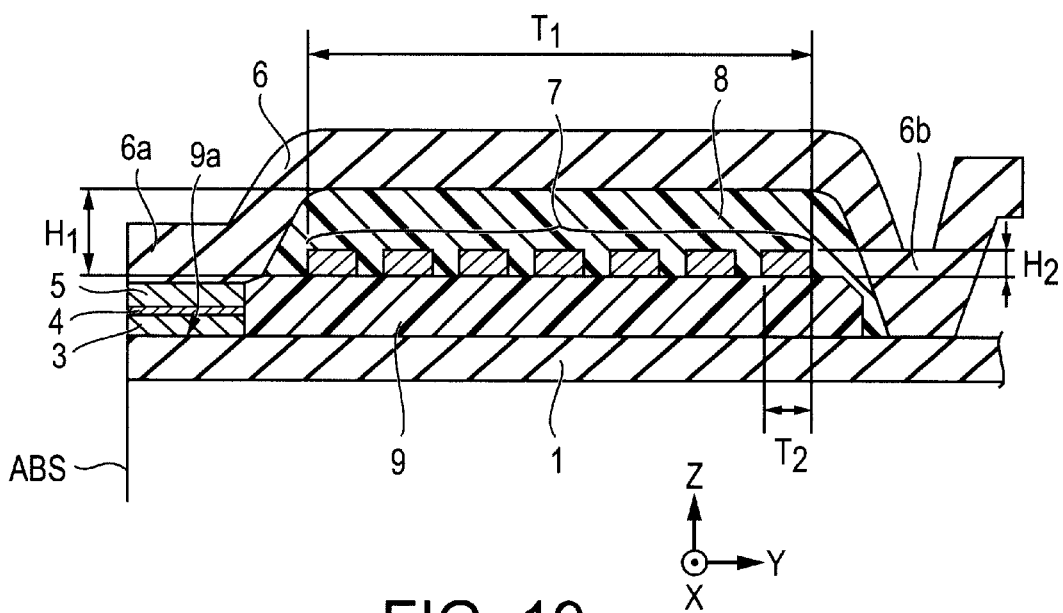
FIG. 19 is a partial cross-sectional view taken along line XIX—XIX of the conventional thin-film magnetic head shown in FIG. 18.

That is, the insulating layer 9 shown in FIG. 18 is provided so that the thin-film magnetic head is suitable for narrower tracks. The insulating layer 9 has the groove 9a having the track width $T_w$ at the face opposing the recording medium. The groove 9a includes the lower magnetic pole layer 3, the gap layer 4, and the upper magnetic pole layer 5, which are formed by plating. Moreover, the coil layer 7 is formed on the insulating layer 9 by patterning, as shown in FIG. 19.

In the present invention, as shown in FIG. 2, the first coil layer 17 is provided behind the track width defining portion 14 in the height direction (Y direction). When the interface between track width defining portion 14 and the upper core layer 16 is defined as a reference plane A, an upper face 17b of the first coil layer 17 and the reference plane A are in the same plane.

As shown in FIG. 2, an insulating underlayer 18 is formed between the lower core layer 10 and the first coil layer 17 to ensure insulation therebetween. The insulating underlayer 18 is preferably formed of at least one insulating material selected from the group consisting of AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

The first coil layer 17 is formed on the insulating underlayer 18. The first coil layer 17 is composed of, for example, Cu, and has a spiral conductive pattern having a coil center 17a. The space between turns of the spiral conductive pattern is filled with the lower first-coil insulating layer 15, which is exposed at the face opposing the recording medium (ABS).

Also an upper face of the lower first-coil insulating layer 15 and the reference plane A are in the same plane. As the result, the upper face of the lower first-coil insulating layer 15 and the upper face 17b of the first coil layer 17 form a flat face.

The lower first-coil insulating layer 15 is composed of an inorganic material. Preferably, the inorganic material is at least one selected from $Al_2O_3$, $SiO_2$, and SiN.

Alternatively, an organic insulating-layer (not shown in the drawing) composed of an organic material may be filled in the gap between the turns of the spiral conductive pattern of the first coil layer 17 at a predetermined height from the lower core layer 10. The inorganic lower first-coil insulating layer 15 may be formed thereon so that the lower first-coil insulating layer 15 and the upper face 17b of the first coil layer 17 are in the same plane.

When the gap between the turns of the spiral conductive pattern of the first coil layer 17 is filled only with the inorganic lower first-coil insulating layer 15, voids are readily formed in the lower first-coil insulating layer 15 due to shadowing effects during sputtering. Air in the voids expands by heat generated during the driving operation of the magnetic head and causes undesired deformation of the thin-film magnetic head.

The organic insulating layer can be filled in the gap without forming voids. Thus, it is preferable that the gap between the turns of the spiral conductive pattern of the first coil layer 17 be filled to some extent with the organic material, for example, a resist, and the lower first-coil insulating layer 15 be formed on the organic insulating layer by sputtering or the like.

As shown in FIG. 2, an upper first-coil insulating layer 22 composed of an organic material, such as a resist or polyimide, is formed on the first coil layer 17. A second coil layer 23 having a spiral pattern is formed on the upper first-coil insulating layer 22. The coil center 23a of the second coil layer 23 is directly electrically connected to the upper face of the coil center 17a of the first coil layer 17 which is aligned in the reference plane A.

The second coil layer 23 is covered with a second-coil insulating layer 24 formed of an organic material such as a resist or polyimide. The upper core layer 16 composed of a magnetic material such as permalloy is formed on the second-coil insulating layer 24 by a frame plating process or the like.

The upper core layer 16 is in contact with the track width defining portion 14 at a leading edge 16a and is magnetically coupled with a back gap layer 25 of a magnetic material formed on the lower core layer 10 at a base portion 16b. The back gap layer 25 maybe omitted. In this case, the base portion 16b of the upper core layer 16 extends over the lower, core layer 10 and is directly magnetically coupled with the lower core layer 10. As shown in FIG. 1, the track width $T_3$ of the leading edge 16a of the upper core layer 16 is larger than the track width $T_w$.

The inductive head in accordance with the present invention has a double-layer coil configuration. The doubler-layer coil configuration can reduce the width $T_4$ of the first coil layer 17 and thus can reduce the length from the leading edge 16a to the base portion 16b of the upper core layer 16. As a result, the magnetic path length from the lower core layer 10 to the upper core layer 16 can be reduced. The resulting thin-film magnetic head exhibits reduced inductance and is suitable for future high recording frequencies. For example, when the first coil layer 17 includes five turns and the second coil layer 23 includes four turns, the width $T_4$ of the first coil layer 17 can be reduced to approximately 20 μm.

As shown in FIG. 2, the first coil layer 17 is disposed behind the track width defining portion 14 in the height direction. The upper face 17b of the first coil layer 17 is aligned in the reference plane A. Thus, the height from the upper face of the lower core layer 10 to the upper face of the second-coil insulating layer 24 covering the second coil layer 23 is smaller than the conventional double-layer coil configuration shown in FIG. 19.

Accordingly, both the total width of the coil layers and the height from the lower core layer 10 can be reduced in the present invention. The length from the leading edge 16a to the base portion 16b of the upper core layer 16 can, therefore, be reduced, resulting in a decreased magnetic path length. The thin-film magnetic head exhibits reduced inductance and is suitable for future higher recording frequencies.

Moreover, the top face of the coil center 17a of the first toil layer 17 is aligned in the reference plane A in the present invention. Thus, the thickness $H_5$ of the spiral conductor of the first coil layer 17 can be increased.

In the thin-film magnetic head shown in FIG. 2, the upper face 17b of the first coil layer 17 can be positioned below the reference plane A. In the present invention, however, the upper face 17b of the first coil layer 17 is intentionally extended to the reference plane A so as to increase the thickness $H_5$ of the first coil layer 17.

The coil layer must have a certain cross-sectional area in order to prevent an increased resistance. Since the thickness $H_5$ of the first coil layer 17 is increased in the present invention, the width $T_5$ of the spiral conductor of the first coil layer 17 can be reduced according to the thickness $H_5$. As a result, the width $T_4$ from the leading edge 16a to the base portion 16b of the upper core layer 16 can be further decreased. Accordingly, the inductance can be further decreased due to the reduced magnetic path length.

In addition, the thin-film magnetic head is suitable for narrower tracks. A method for determining the track width $T_w$ of the track width defining portion 14 will be described in detail below. In the present invention, the track width $T_w$ of the track width defining portion 14 can be controlled to be not more than 0.7 μm and preferably not more than 0.5 μm. This width is smaller than the resolution in exposure and development of a resist.

In the present invention, both the upper face 17b of the first coil layer 17 and the upper face of the lower first-coil insulating layer 15 are aligned in the references plane A. Thus, the upper first-coil insulating layer 22 is formed on the reference plane A and is also substantially planarized.

The second coil layer 23 can be precisely formed on the planarized upper first-coil insulating layer 22 by patterning. The protrusion of the insulating layer covering the coil layer from the reference plane A corresponds to the thickness of the second-coil insulating layer 24. As a result, the difference in step between the reference plane A and the second-coil insulating layer 24 is small. Accordingly, the upper core layer 16 having a precise pattern can be formed over the track width defining portion 14 and the second-coil insulating layer 24.

The embodiment in FIG. 2 shows a double-layer coil configuration. In the present invention, a single-layer coil configuration may be incorporated. That is, a single first coil layer 17 having 9 turns may be formed instead of the first coil layer 17 and the second coil layer 23. In the single coil layer configuration, the upper core layer 16 is formed by patterning on the upper first-coil insulating layer 22, which covers the single first coil layer 17. Since the width $T_4$ of the single first coil layer 17 extending from the leading edge 16a to the base portion 16b of the upper core layer 16 is increased, the magnetic path length and thus inductance are increased. The inductance in this case, however, is still lower than that of the inductive head having the single-layer configuration shown in FIG. 19.

The leading edge 16a of the upper core layer 16 is provided on the reference plane A in the present invention, whereas the coil layer 7 is formed on the insulating layer 9 and above a reference plane A defined by the interface of the upper magnetic pole layer 5 and the upper core layer 6 in the conventional inductive head shown in FIG. 19.

Thus, the height from the upper face of the lower core layer 10 to the upper face of the upper first-coil insulating layer 22 in the present invention is smaller than the height in the conventional inductive head shown in FIG. 19. As a result, the thin-film magnetic head of the present invention has a reduced length of the upper core layer 16 and exhibits reduced inductance due to a reduced magnetic path length.

In the present invention, as shown in FIG. 2, the first coil layer 17 preferably includes a conductive base layer 26 composed of Cu or the like and a conductive protective layer 27 formed thereon and composed of Ni or the like. The Cu conductive base layer 26 can reduce the resistance of the coil and can allow a large current to flow. The conductive base layer 26 may be composed of at least one element of Cu and Au and may have a single- or double-layer configuration.

The conductive protective layer 27 may be composed of at least one nonoxidative element selected from the group consisting of Ni, P, Pd, Pt, B, Au, and W, and may have a single- or double-layer configuration.

As shown in FIG. 2, the upper face of the conductive base layer 26 of the first coil layer 17 is slightly recessed from the reference plane A so as to expose the conductive protective layer 27 in the reference plane A. The conductive protective layer 27 protects the conductive base layer 26 from oxidation and maintains the allowable current and the coil resistance constant.

As shown in FIG. 2, the upper first-coil insulating layer 22 is formed on the first coil layer 17. The upper face 17b of the first coil layer 17 is exposed to air before the upper first-coil insulating layer 22 is formed. If the first coil layer 17 is formed of a single conductive base layer 26 composed of Cu or the like, the surface of the conductive base layer 26 is oxidized. The oxidation of the conductive base layer 26 precludes adhesion to the upper first-coil insulating layer 22, the coil center 17a of the first coil layer 17, and the second coil layer 23 of the second coil layer 23. The oxidation of the conductive base layer 26 causes separation at the bonded faces. Moreover, the oxidized layer causes unstable resistance of the coil of the inductive head, resulting in unsatisfactory recording characteristics.

In the present invention, the conductive protective layer 27 composed of, for example, Ni and formed on the conductive base layer 26 can protect the conductive base layer 26 from oxidation.

It is preferable that the thickness of the conductive protective layer 27 be in a range of approximately 0.1 to 0.5 μm. The Ni conductive protective layer 27 is also oxidized in air, but the thickness of the oxidized layer is approximately 3.0 nm at most. Thus, the oxidized layer on the conductive protective layer 27 can be readily removed by ion milling without adversely affecting the conductive base layer 26. Thus, the conductive base layer 26 can maintain a required cross-sectional area.

Also the second coil layer 23 may have a double-layer configuration including a conductive base layer and all conductive protective layer.

The conductive base layer 26 and the conductive protective layer 27 are preferably formed by continuous plating.

Figure 3:
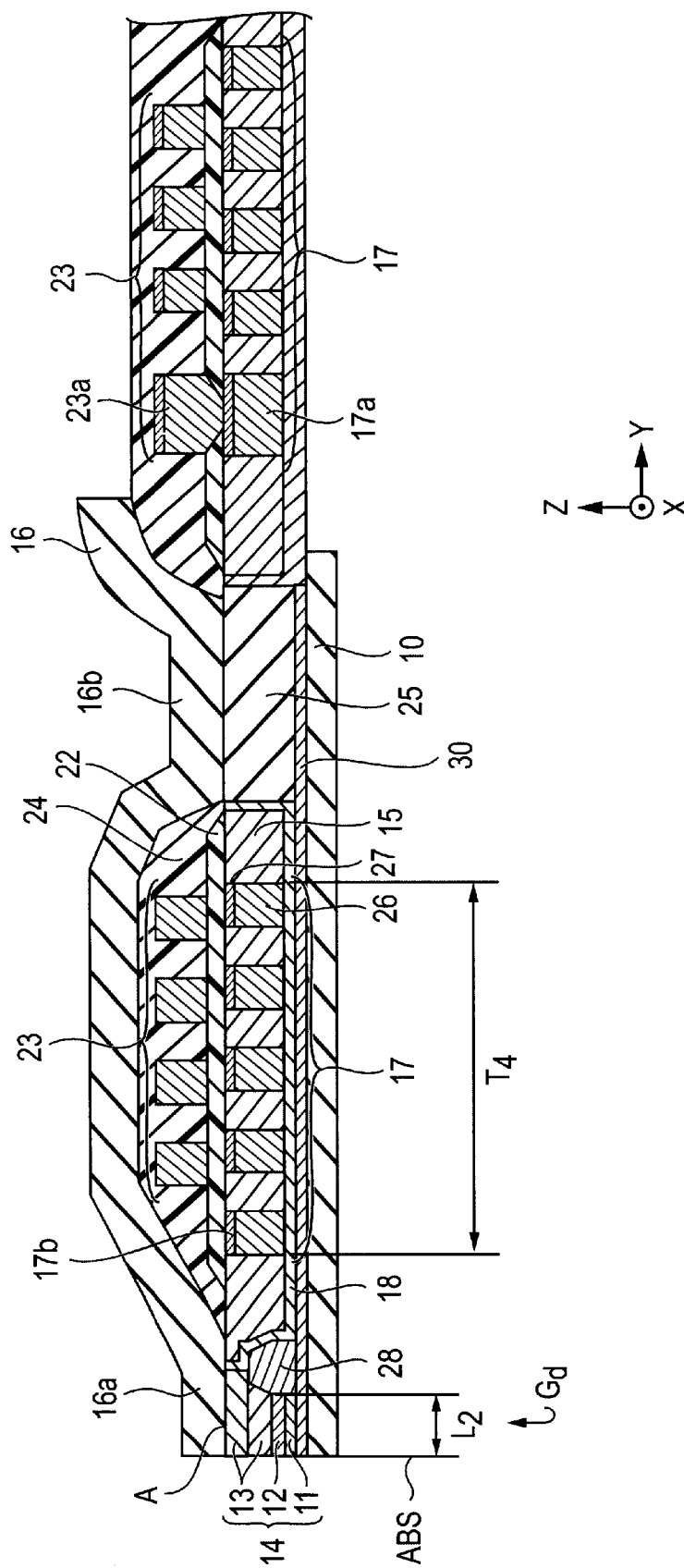
FIG. 3 is a partial cross-sectional view of a thin-film magnetic head in accordance with a second embodiment of the present invention.

FIG. 3 is a partial cross-sectional view of a thin-film magnetic head in accordance with a second embodiment of the present invention. The thin-film magnetic head of this embodiment has an insulating layer 28 for defining the gap depth Gd in addition to the configuration shown in FIG. 1.

The thin-film magnetic head has the track width defining portion 14 having the track width $T_w$ and a predetermined length from the face opposing the recording medium (ABS) in the height direction (Y direction) on the lower core layer 10.

The track width defining portion 14 may have any film configuration as long as the configuration includes the gap layer 12 and at least one of the lower magnetic pole layer 11 in contact with the lower core layer 10 and the upper magnetic pole layer 13 in contact with the upper core layer 16. The gap layer 12 insulates the upper magnetic layer(s) from the lower magnetic layer(s). The lower magnetic pole layer 11, the upper magnetic pole layer 13, and the gap layer 12 may have single-layer or double-layer configurations. In the embodiment shown in FIG. 3, the upper magnetic pole layer 13 has a double-layer configuration.

As described above, the insulating layer 28 for defining the gap depth Gd is formed behind the track width defining portion 14. The insulating layer 28 is composed of an insulating material. The gap depth $G_d$ is defined by a length $L_2$ of the gap layer 12 from the front end of the insulating layer 28 to the face opposing the recording medium (ABS).

As shown in FIG. 3, the upper face of the insulating layer 28 for defining the gap depth Gd protrudes and the front end of the insulating layer 28 is tilted backward (in the Y direction). That is, the length from the front side of the insulating layer 28 for defining the gap depth Gd to the ABS increases along the Z direction.

The upper magnetic pole layer 13 extends from halfway at the top of the insulating layer 28 for defining the gap depth Gd. The length of the upper magnetic pole layer 13 is larger than those of the gap layer 12 and the lower magnetic pole layer 11. Thus, the upper magnetic pole layer 13 has an increased volume, which can prevent magnetic saturation and can improve magnetic efficiency.

As shown in FIG. 3, the upper face 17b of the first coil layer 17 is aligned in the reference plane A defined by the interface between the track width defining portion 14 and the upper core layer 16. The first coil layer 17 is formed on the lower core layer 10 with the insulating underlayer 18 provided therebetween for ensuring insulation between the lower core layer 10 and the first coil layer 17. The lower first-coil insulating layer 15 fills the gap between the turns of the spiral conductive pattern of the first coil layer 17. The lower first-coil insulating layer 15 is preferably formed of at least one inorganic material selected from $Al_2O_3$, $SiO_2$, and SiN. The gap between the turn may be filled with an organic material such as a resist and then with the inorganic lower first-coil insulating layer 15.

The second coil layer 23 having a spiral pattern is formed on the lower first-coil insulating layer 15 with the upper first-coil insulating layer 22 therebetween. The upper face of the first coil layer 17 and the upper face of the lower first-coil insulating layer 15 are aligned in the reference plane A. Thus, the second coil layer 23 having a precise pattern can be formed on the upper first-coil insulating layer 22 provided on the flat surface (reference plane A).

The second coil layer 23 is covered with the second-coil insulating layer 24 formed of an organic material such as a resist or polyimide. The upper core layer 16 is formed on the second-coil insulating layer 24 by patterning. The upper core layer 16 is in contact with the track width defining portion 14 at a leading edge 16a. The upper core layer 16 is in contact with the back gap layer 25 of a magnetic material formed on the lower core layer 10 at a base portion 16b.

Moreover, the top face of the coil center 17a of the first coil layer 17 is aligned in the reference plane A in the present invention. The coil center 23a of the second coil layer 23 is electrically connected to the top face of the coil center 17a of the first coil layer 17.

Also in this embodiment, the two coil layers are deposited, and the upper face 17b of the first coil layer 17 is aligned in the reference plane A behind the track width defining portion 14 in the height direction. This double-layer coil configuration can reduce the width $T_4$ of the first coil layer 17 and thus can reduce the height from the upper face of the lower core layer 10 to the upper face of the second-coil insulating layer 24. Accordingly, the length from the leading edge 16a to the base portion 16b of the upper core layer 16 can be reduced. The magnetic path length can be reduced. The resulting thin-film magnetic head exhibits reduced inductance.

Since the coil center 17a of the first coil layer 17 is aligned in the reference plane A, the first coil layer 17 has a thickness which is increased as much as possible. By this configuration, the thickness of the first coil layer 17 can be increased as much as possible. The width of the spiral conductor of the first coil layer 17 can be reduced depending on the thickness. Accordingly, the total width $T_4$ of the first coil layer 17 can be reduced. Since the magnetic path length from the lower core layer 10 to the upper core layer 16 can be reduced, the thin-film magnetic head exhibits reduced inductance and is suitable for narrower tracks.

Since the upper first-coil insulating layer 22 and the second-coil insulating layer 24 are formed on the flat reference plane A, the step between the top face of the second-coil insulating layer 24 and the reference plane A can be reduced. Thus, the upper core layer 16 having a precise pattern can be formed.

The first coil layer 17 includes the conductive base layer 26 composed of Cu and the conductive protective layer 27 formed thereon, and the conductive protective layer 27 is formed on the reference plane A. The conductive protective layer 27 can protect the conductive base layer 26 from oxidation and maintains the allowable current and the coil resistance constant.

FIGS. 4 to 11 show a series of steps of a method for making the thin-film magnetic head of the present invention shown in FIG. 2. These steps show the production of the upper core layer 16 to the base portion 16b of the upper core layer 16. These steps do not show the production at the height side of the base portion 16b, which will be described in a method for making the thin-film magnetic head shown in FIG. 3.

Figure 4:
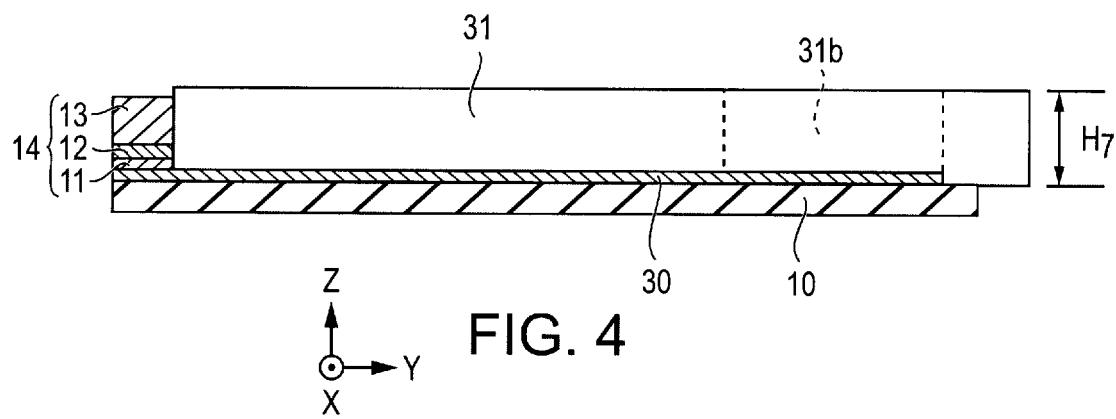
FIG. 4 is a cross-sectional view showing the formation of layers for making the thin-film magnetic head shown in FIG. 2.

With reference to FIG. 4, a magnetic underlayer 30 composed of a magnetic material such as permalloy is formed on the lower core layer 10. A resist layer 31 is formed thereon by coating. A thickness $H_7$ of the resist layer 31 must be larger than the thickness $H_4$ of the track width defining portion 14 in the completed thin-film magnetic head.

A groove 31a is formed in the resist layer 31 by exposure and development so that the groove 31a has a predetermined length from the face opposing the recording medium in the height direction (Y direction in the drawing) and a predetermined width in the track width direction (X direction in the drawing). The track width defining portion 14 is formed in the groove 31a. The track width defining portion 14 includes the lower magnetic pole layer 11, the gap layer 12, and the upper magnetic pole layer 13 from the bottom. These layers are formed by continuous plating.

The track width defining portion 14 can have any configuration in addition to the above triple-layer configuration. For example, the track width defining portion 14 may be composed of the lower magnetic pole layer 11 and the nonmagnetic gap layer 12. Alternatively, the track width defining portion 14 may be composed of the nonmagnetic gap layer 12 and the upper magnetic pole layer 13. These magnetic pole layers 11 and 13 and gap layer 12 may have single-layer or multi-layer configurations.

Preferably, the gap layer 12 is formed together with the magnetic pole layers 11 and 13 by continuous plating. The gap layer 12 is preferably composed of at least one nonmagnetic metal material selected from the group consisting of NiP, NiPd, NiW, NiMo, NiRh, Au, Pt, Rh, Pd, Ru, and Cr. These materials are suitable for continuous plating.

A hole 31b is formed at a back portion in the height direction (Y direction) of the resist layer 31 by exposure and development. The magnetic back gap layer 25 is formed in the hole 31b by plating. The resist layer 31 is then removed.

Figure 5:
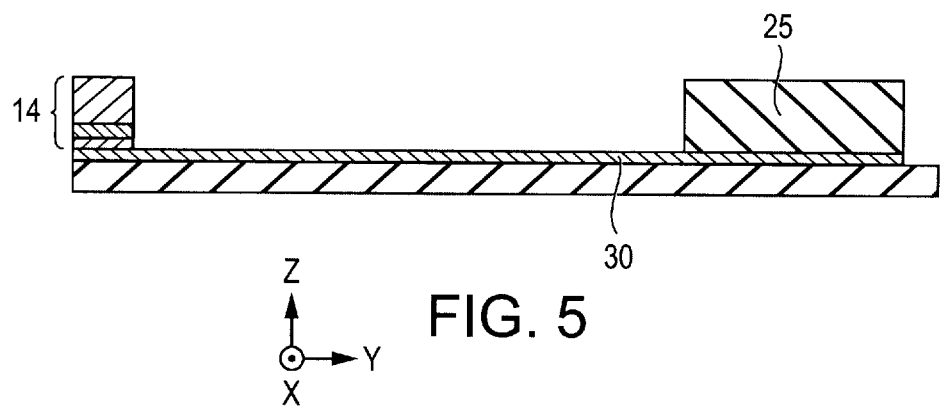
FIG. 5 is a cross-sectional view showing the formation of the track width defining portion and a back gap layer for making the thin-film magnetic head in FIG. 2.

With reference to FIG. 5, on the lower core layer 10, the track width defining portion 14 is formed in the vicinity of the ABS and the back gap layer 25 is formed distant from the track width defining portion 14 in the height direction.

In FIG. 5, both sides in the X direction of the track width defining portion 14 may be etched by ion milling from the track width direction (X direction) in order to reduce the width of the track width defining portion 14. This step is not shown in FIG. 5. The width of the track width defining portion 14 after the ion milling is defined as the track width $T_w$. Ion milling can also be used to etch the upper face of the lower core layer 10 in the track width direction (X direction) to form sloping surfaces 10b downward from the base end of the lower magnetic pole layer 11, as shown in FIG. 1.

Figure 6:
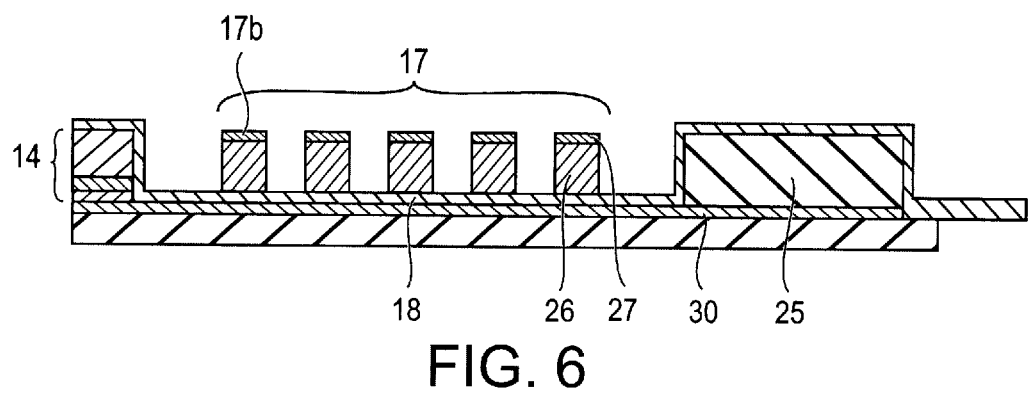
FIG. 6 is a cross-sectional view showing the formation of the lower coil layer for making the thin-film magnetic head in FIG. 2.

With reference to FIG. 6, the insulating underlayer 18 composed of an insulating material is formed over the track width defining portion 14, the lower core layer 10, and they back gap layer 25 and extends in the height direction.

Next, the first coil layer 17 having a spiral pattern is formed on the insulating underlayer 18 by a patterning process. In the patterning process, the upper face 17b of the first coil layer 17 must be higher than the upper face 14a of the track width defining portion 14 in the step shown in FIG. 8. As shown in FIG. 6, the first coil layer 17 preferably includes the conductive base layer 26 and the conductive protective layer 27 formed thereon. The conductive base layer 26 is preferably composed of at least one element of Cu and Au and may have a single- or multi-layer configuration. The conductive protective layer 27 is preferably composed of at least one element selected from the group consisting of Ni, P, Pd, Pt, B, Au, and W and may have a single- or multi-layer configuration. In the case of the first coil layer 17 having the conductive base layer 26 and the conductive protective layer 27, it is preferable that the upper face of the conductive base layer 26 be lower than the upper face 14a of the track width defining portion 14. It also is preferable that the upper face of the conductive protective layer 27 (the upper face 17b of the first coil layer 17) be higher than the upper face 14a in the step shown in FIG. 8.

With reference to FIG. 7, the first coil layer 17 is covered with the lower first-coil insulating layer 15. In this step, the lower first-coil insulating layer 15 also covers the track width defining portion 14 and the back gap layer 25. In the present invention, the lower first-coil insulating layer 15 is preferably formed by sputtering using at least one inorganic material selected from the group consisting of $Al_2O_3$, $Si_2$, and SiN.

Next, the lower first-coil insulating layer 15 is polished by a chemical-mechanical polishing process or the like up to line B—B.

With reference to FIG. 8, the upper face 14a of the track width defining portion 14 and the upper face 17b of the first coil layer 17 are exposed by the polishing in the same plane, because the upper face 17b of the first coil layer 17 in the step shown in FIG. 6 is higher than the upper face 14a of the track width defining portion 14 after the step shown in FIG. 8.

If the upper face 17b of the first coil layer 17 in the step shown in FIG. 6 is lower than the upper face 14a of the track width defining portion 14 after the step shown in FIG. 8, the upper face 17b is not exposed after the polishing process and is completely embedded in the lower first-coil insulating layer 15. In this case, the upper first-coil insulating layer 22 shown in FIG. 9 for ensuring insulation between the first coil layer 17 and the second coil layer 23 is unnecessary and the second coil layer 23 can be directly formed on the lower first-coil insulating layer 15.

Regardless of such an advantage, in the present invention, the upper face 17b of the first coil layer 17 is intentionally exposed in the same plane in order to maximize the thickness $H_5$ of the first coil layer 17. As a result, the width $T_5$ of the spiral conductive pattern of the first coil layer 17 can be reduced depending on the thickness $H_5$ without an increase in the resistance of the coil due to a decreased cross-sectional area of the coil layer.

The reduced width $T_5$ of the spiral conductive pattern of the first coil layer 17 results in a decreased total width of the first coil layer 17 between the track width defining portion 14 and the back gap layer 25. Accordingly, the magnetic path length can be decreased due to the reduced width of the first coil layer 17.

In the step shown in FIG. 8, the conductive protective layer 27 of the first coil layer 17 is exposed by the etching of the lower first-coil insulating layer 15. In this state, the conductive protective layer 27 preferably has a thickness of approximately 0.1 to 0.5 μm.

The conductive protective layer 27 protects the conductive base layer 26 of the first coil layer 17 from oxidation. Approximately the top 3.0 nm of the exposed conductive protective layer 27 is oxidized. Since the conductive protective layer 27 has a thickness of approximately 0.1 to 0.5 μm, the topmost oxidized layer can be removed by ion milling without reducing the thickness of the conductive base layer 26. Since the volume of the conductive base layer 26 is not changed, the resistance and the allowable current of the first coil layer 17 can be maintained constant.

With reference to FIG. 9, the upper first-coil insulating layer 22 is formed over the first coil layer 17 and the lower first-coil insulating layer 15. The upper first-coil insulating layer 22 is formed of, for example, an organic material, such as a resist or polyimide.

In the present invention, the upper face 14a of the track width defining portion 14, the upper face 17b of the first coil layer 17, and the upper face of the lower first-coil insulating layer 15 are aligned in the same plane. Thus, a flat plane extends from the upper face 14a of the track width defining portion 14 in the height direction (Y direction). The upper first-coil insulating layer 22 is formed on the flat plane. As a result, the top face of the upper first-coil insulating layer 22 is also flat. The second coil layer 23 having a precise pattern can be formed on the upper first-coil insulating layer 22. Thereby, the pitch of the spiral conductor of the second coil layer 23, that is, the width of the second coil layer 23 can be reduced.

The second coil layer 23 may include a conductive base layer (not shown) and a conductive protective layer (not shown) formed thereon, as in the first coil layer 17. For the second coil layer 23, the conductive base layer 26 is preferably composed of at least one element of Cu and Au and may have a single- or multi-layer configuration. The conductive protective layer is preferably composed of at least one element selected from the group consisting of Ni, P, Pd, Pt, B, Au, and W and may have a single- or multi-layer configuration.

Figure 10:
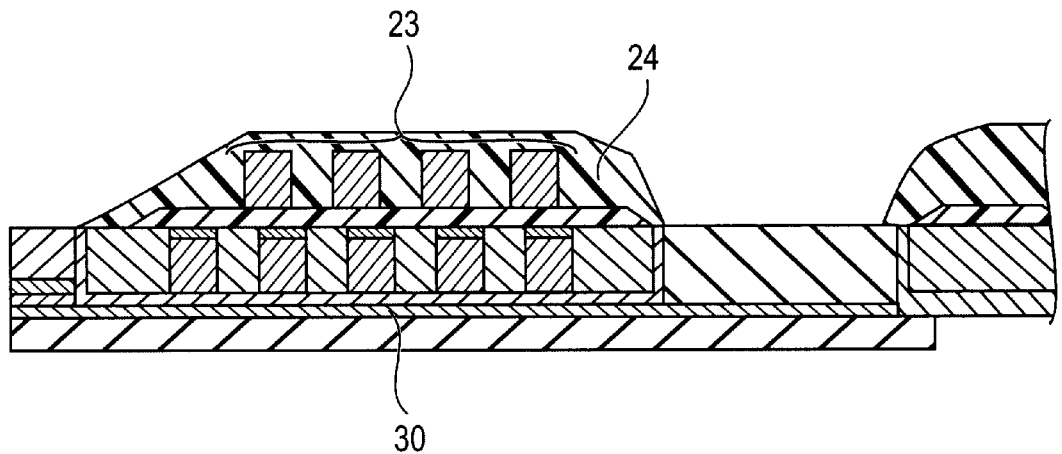
FIG. 10 is a cross-sectional view showing the formation of the second coil insulating layer for making the thin film magnetic head in FIG. 2.

With reference to FIG. 10, the second coil layer 23 is covered with the second-coil insulating layer 24. Preferably, the second-coil insulating layer 24 is formed of an organic insulating material such as a resistor polyimide.

Figure 11:
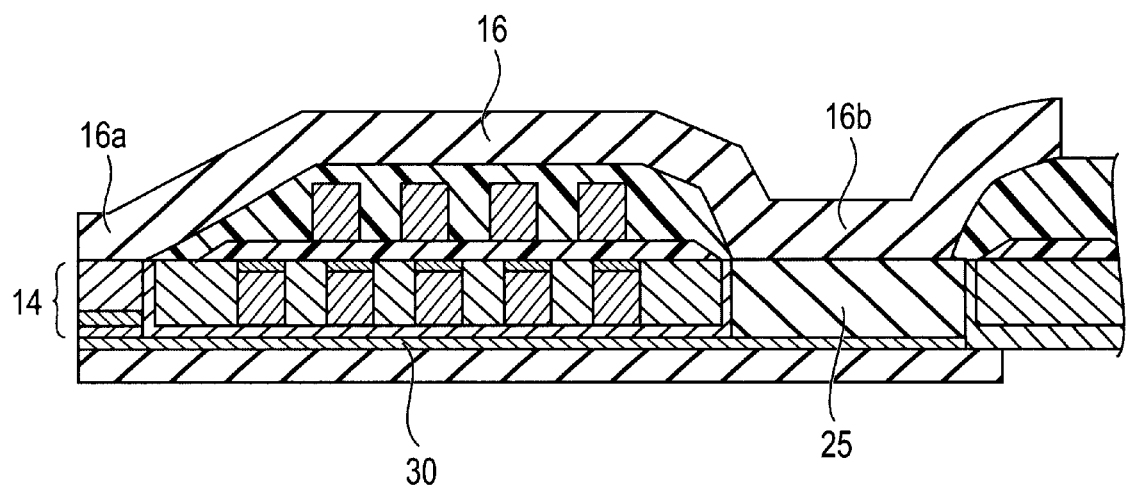
FIG. 11 is a cross-sectional view showing the formation of the upper core layer for making the thin film magnetic head in FIG. 2.

With reference to FIG. 11, the upper core layer 16 is formed on the second-coil insulating layer 24 by a conventional patterning process, such as a frame plating process. As shown in FIG. 11, the upper core layer 16 is in contact with the track width defining portion 14 at the leading edge 16a and is magnetically coupled with the back gap layer 25 formed on the lower core layer 10 at the base portion 16b.

The method for making the thin-film magnetic-head shown in FIG. 3 will now be described with reference to FIGS. 12 to 17.

With reference to FIG. 12, the magnetic underlayer 30 composed of a magnetic material such as permalloy is formed on the lower core layer 10. The insulating layer 28 for defining the gap depth Gd composed of a resist or the like is formed at a predetermined position on the magnetic underlayer 30.

For example, a rectangular resist layer is formed on the lower core layer 10 and is baked to cause sagging of the resist layer. As shown in FIG. 12, the front end 28a of the insulating layer 28 is tilted backward (in the Y direction). The length $L_2$ from the front end 28a of the insulating layer 28 for defining the gap depth Gd to the face opposing the recording medium (ABS) determines the gap depth Gd.

As in the step shown in FIG. 4, the resist layer 31 is applied onto the lower core layer 10 and the groove 31a is formed in the resist layer 31 by exposure and development. The groove 31a has a predetermined length from the face opposing the recording medium in the height direction (Y direction) and a predetermined width in the track width direction (X direction). The track width defining portion 14 is formed in the groove 31a. The track width defining portion 14 includes the lower magnetic pole layer 11, the gap layer 12, and the upper magnetic pole layer 13, which are formed by continuous plating.

The track width defining portion 14 can have any configuration in addition to the above triple-layer configuration, as long as the track width defining portion 14 includes the gap layer 12 and at least one of the lower magnetic pole layer 11 coupled with the lower core layer 10 and the upper magnetic pole layer 13 coupled with the upper core layer 16. The gap layer 12 magnetically insulates the upper magnetic layer(s), which includes the upper core layer 16, from the lower magnetic layer(s), which includes the lower core layer 10.

With reference to FIG. 13, the track width defining portion 14 is formed on the lower core layer 10 in the vicinity of the ABS and the back gap layer 25 is formed at a position distant from the track width defining portion 14 in the height direction.

Both sides of the track width defining portion 14 shown in FIG. 12 may be etched by ion milling in the track width direction (X direction) to decrease the width of the track width defining portion 14. The width of the track width defining portion 14 after the ion milling defines the track width $T_w$. Ion milling can also be used to etch the upper face of the lower core layer 10 in the track width direction (X direction) to form sloping surfaces 10b downward from the base end of the lower magnetic pole layer 11, as shown in FIG. 1.

With reference to FIG. 14, the insulating under layer 18 composed of an insulating material is formed over the track width defining portion 14, the lower core layer 10, and the back gap layer 25 and extends in the height direction.

Next, the coil center 17a of the first coil layer 17 is formed and the first coil layer 17 having a spiral pattern is formed by a patterning process. In the patterning process, the upper face 17b of the first coil layer 17 must be higher than the upper face 14a of the track width defining portion 14 in the step shown in FIG. 15. As shown in FIG. 14, the first coil layer 17 preferably includes the conductive base layer 26 and the conductive protective layer 27 formed thereon. The conductive base layer 26 is preferably composed of at least one element of Cu and Au and may have a single- or multi-layer configuration. The conductive protective layer 27 is preferably composed of at least one element selected from the group consisting of Ni, P, Pd, Pt, B, Au, and W and may have a single- or multi-layer configuration. In the case of the first coil layer 17 having the conductive base layer 26 and the conductive protective layer 27, it is preferable that the upper face of the conductive base layer 26 be lower than the upper face 14a of the track width defining portion 14 and the upper face of the conductive protective layer 27 (the upper face 17b of the first coil layer 17) be higher than the upper face 14a in the step shown in FIG. 15.

With reference to FIG. 14, the first coil layer 17 is covered with the lower first-coil insulating layer 15. In this step, the lower first-coil insulating layer 15 also covers the track width defining portion 14 and the back gap layer 25. In the present invention, the lower first-coil insulating layer 15 is preferably formed by sputtering using at least one inorganic material selected from the group consisting of $Al_2O_3$, $SiO_2$, and SiN.

Next, the lower first-coil insulating layer 15 is polished by a chemical-mechanical polishing process or the like up to line B—B.

Figure 15:
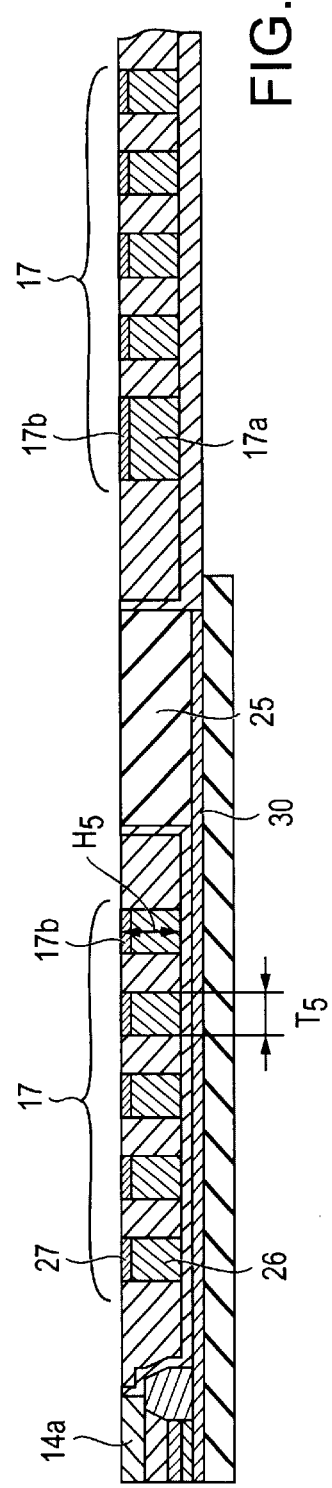
FIG. 15 is a cross-sectional view showing the results of polishing the lower first-coil insulating layer of the thin-film magnetic head in FIG. 3.

With reference to FIG. 15, the upper face 14a of the track width defining portion 14 and the upper face 17b of the first coil layer 17 are exposed by the polishing in the same plane. This occurs because the upper face 17b of the first coil layer 17 in the step shown in FIG. 14 is higher than the upper face 14a of the track width defining portion 14 after the step shown in FIG. 15.

This configuration can maximize the thickness $H_5$ of the first coil layer 17. As a result, the width $T_5$ of the spiral conductive pattern of the first coil layer 17 can be reduced depending on the thickness $H_5$ without an increase in the resistance of the coil due to a decreased cross-sectional area of the coil layer.

In the step shown in FIG. 15, the conductive protective layer 27 of the first coil layer 17 is exposed by the etching of the lower first-coil insulating layer 15. In this state, the conductive protective layer 27 preferably has a thickness of approximately 0.1 to 0.5 μm.

The conductive protective layer 27 protects the conductive base layer 26 of the first coil layer 17 from oxidation. Approximately the top 3.0 nm of the exposed conductive protective layer 27 is oxidized in air. Since the conductive protective layer 27 has a thickness of approximately 0.1 to 0.5 μm, the topmost oxidized layer can be removed by ion milling without reducing the thickness of the conductive base layer 26. Since the volume of the conductive base layer 26 is not changed, the resistance and the allowable current of the first coil layer 17 can be maintained constant.

As shown in FIG. 15, the upper face 17b of the coil center 17a of the first coil layer 17 and the upper face 14a of the track width defining portion 14 are also aligned in the same plane. The upper face 17b of the coil center 17a is exposed.

Figure 16:
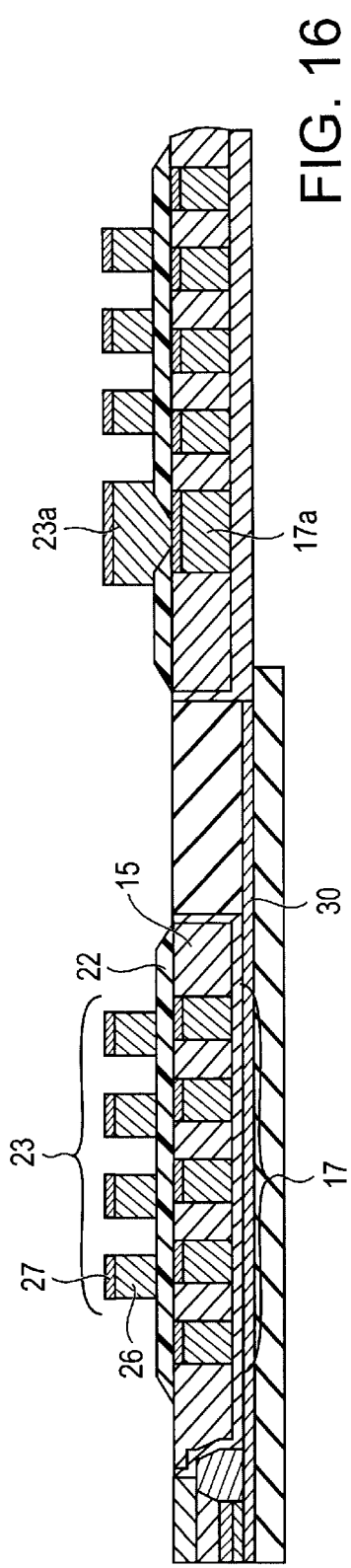
FIG. 16 is a cross-sectional view showing the formation of the upper coil layer for making the thin-film magnetic head in FIG. 3.
Figure 17:
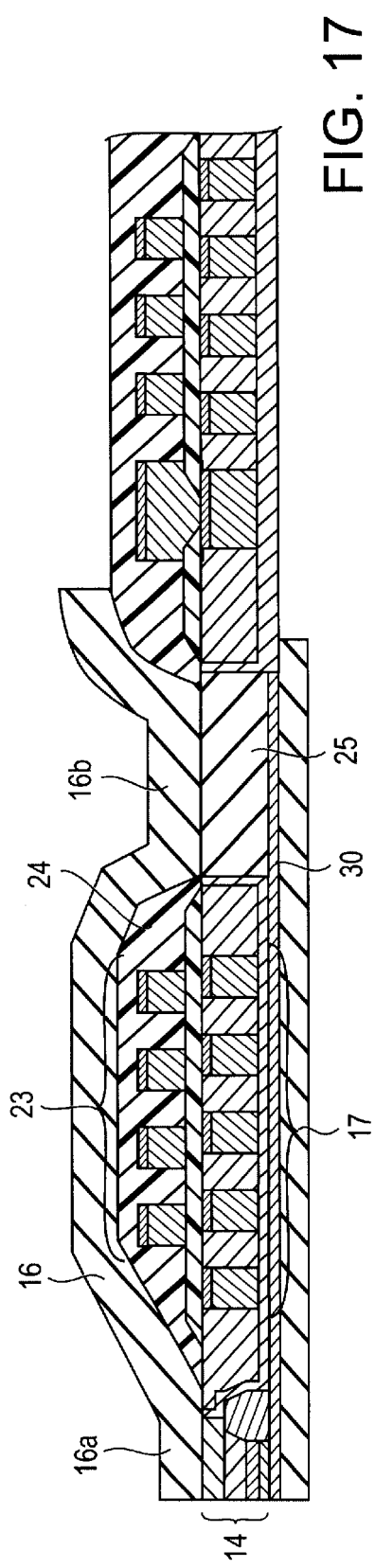
FIG. 17 is a cross-sectional view showing the formation of the second coil insulating layer and the upper core layer for making the thin-film magnetic head in FIG. 3.

With reference to FIG. 16, the upper first-coil insulating layer 22 is formed over the first coil layer 17 and the lower first-coil insulating layer 15. The upper first-coil insulating layer 22 is formed of, for example, an organic material, such as a resist or polyimide.

In the present invention, the upper face 14a of the track width defining portion 14, the upper face 17b of the first coil layer 17, and the upper face of the lower first-coil insulating layer 15 are aligned in the same plane. Thus, a flat plane extends from the upper face 14a of the track width defining portion 14 in the height direction (Y direction). The upper first-coil insulating layer 22 is formed on the flat plane. As a result, the top face of the upper first-coil insulating layer 22 is also flat. The second coil layer 23 having a precise pattern can be formed on the upper first-coil insulating layer 22. Thereby, the pitch of the spiral conductor of the second coil layer 23, that is, the width of the second coil layer 23, can be reduced.

The second coil layer 23 may include the conductive base layer 26 and the conductive protective layer 27 formed thereon, as in the first coil layer 17. For the second coil layer 23, the conductive base layer 26 is preferably composed of at least one element of Cu and Au and may have a single- or multi-layer configuration. The conductive protective layer 27 is preferably composed of at least one element selected from the group consisting of Ni, P, Pd, Pt, B, Au, and W and may have a single- or multi-layer configuration.

In this embodiment, the coil center 23a of the second coil layer 23 is directly electrically connected to the coil center 17a of the first coil layer 17.

If the coil center 17a is embedded in the lower first-coil insulating layer 15 and is not exposed to the exterior, the lower first-coil insulating layer 15 on the coil center 17a must be removed by etching.

Since the upper face 17b (as shown in FIG. 15) is exposed in the present invention, the coil center 23a (as shown in FIG. 16) of the second coil layer 23 can be directly formed on the coil center 17a of the first coil layer 17 by patterning. Thus, the production steps can be simplified.

With reference to FIG. 7, the second coil layer 23 is covered with the second-coil insulating layer 24 formed of an organic insulating material, such as a resist or polyimide. The upper core layer 16 is formed on the second-coil insulating layer 24 by a known patterning process, such as a frame plating process. The upper core layer 16 is in contact with the track width defining portion 14 at the leading edge 16a. The upper core layer 16 is magnetically coupled with the back gap layer 25 on the lower core layer 10 at the base portion 16b.

As described above, in the method for making the thin-film magnetic head of the present invention, the track width defining portion 14 is preliminarily formed on the lower core layer 10 using the resist layer 31. Thus, no layer is formed on the position for forming the first coil layer 17 on the lower core layer 10 in the subsequent step. As a result, the first coil layer 17 can be formed on the thin insulating underlayer 18 provided on the lower core layer 10. The upper face 17b of the first coil layer 17 can be aligned in the upper face 14a of the track width defining portion 14 as the reference plane A.

Accordingly, the double-layer coil configuration of the present invention decreases the width of the coil layer and decreases the height from the lower core layer 10 to the upper face of the second-coil insulating layer 24 on the second coil layer 23. The double-layer coil configuration also decreases the magnetic path length.

Since the upper face 17b of the first coil layer 17 and the upper face 14a of the track width defining portion 14 are aligned in the same plane, the height of the first coil layer 17 can be maximized by the method shown in FIGS. 4 to 11 or FIGS. 12 to 17. As a result, the width of the first coil layer 17 can be decreased in order to further decrease the magnetic path length and inductance.

Since the coil center 17a of the first coil layer 17 is also aligned in the same plane as that of the upper face 14a of the track width defining portion 14 and is exposed to the exterior, the coil center 23a of the second coil layer 23 can be directly deposited on the coil center 17a of the first coil layer 17. This configuration provides simplified production steps.

Moreover, the coil layers do not so significantly protrude from the reference plane A. Thus, the inductance can be reduced by increasing the magnetic path length. The upper core layer 16 having a precise pattern can be formed.

In the present invention, a single-layer coil configuration may also be employed. In this case, a coil layer having a predetermined number of turns (corresponding to the first coil layer 17), an upper coil insulating layer (corresponding to the upper first-coil insulating layer 22), and an upper core layer (corresponding to the upper core layer 16) are formed in that order to complete a thin-film magnetic head.

Both sides in the track width direction of the track width defining portion 14 on the lower core layer 10 may be etched by ion milling in the step shown in FIG. 5 or 13. This side etching step facilitates the formation of the track width defining portion 14 having a decreased width, that is, a narrower track width $T_w$. The resulting thin-film magnetic head is suitable for narrower tracks. The track width $T_w$ of the track width defining portion 14 is preferably not more than 0.7 µm and more preferably not more than 0.5 µm.

While the invention has been descried an illustrated, this description is by way of example only. Additional advantages will occur readily to those skilled in the art, who may make numerous changes without departing from the true spirit and scope of the invention. Therefore, the invention is not limited to the specific details, representative devices, and illustrated examples in this description. Accordingly, the scope of this invention is to be limited only as necessitated by the accompanying claims.

What is claimed is:

1. A thin-film magnetic head comprising:
   a lower core layer;
   an upper core layer magnetically coupled to the lower core layer;
   a track width defining portion disposed between the upper and lower core layers, the track width defining portion defining a track width;
   a first coil layer for inducing recording magnetic fields between the upper and lower core layers, the first coil layer having a spiral conductive pattern with a predetermined number of turns and a space between the turns of the spiral conductive pattern, wherein the first coil layer is provided beneath the track width defining portion in a height direction, wherein an upper face of the first coil layer is aligned in a reference plane defined by an interface between the track width defining portion and the upper core layer;
   a lower first-coil insulating layer disposed in the space between the turns of the spiral conductive pattern of the first coil layer, the lower first-coil insulating layer disposed between the upper and lower core layers and adjacent to the track width defining portion;
   a gap layer provided between the lower core layer and the upper core layer, the gap layer for magnetically insulating the lower core layer and the upper core layer;
   wherein the upper core layer is provided over the track width defining portion, the first coil layer, and the lower first-coil insulating layer;
   wherein the upper core layer has an upper magnetic pole layer thereunder;
   wherein the lower core layer has a lower magnetic pole layer thereon;
   wherein the track width defining portion includes at least one of the lower magnetic pole layer in contact with the lower core layer and the upper magnetic pole layer in contact with the upper core layer; and
   wherein the gap layer is composed of a material selected from the group consisting of NiP, NiPd, NiW, NiMo, NiRh, Au, Pt, Rh, Pd, Ru, and Cr.

2. A thin-film magnetic head comprising:
   a lower core layer;
   an upper core layer magnetically coupled to the lower core layer;
   a track width defining portion disposed between the upper and lower core layers, the track width defining portion defining a track width;
   a first coil layer for inducing recording magnetic fields between the upper and lower core layers, the first coil layer having a spiral conductive pattern with a predetermined number of turns and a space between the turns of the spiral conductive pattern, wherein the first coil layer is provided beneath the track width defining portion in a height direction, wherein an upper face of the first coil layer is aligned in a reference plane defined by an interface between the track width defining portion and the upper core layer;
   a lower first-coil insulating layer disposed in the space between the turns of the spiral conductive pattern of the first coil layer, the lower first-coil insulating layer disposed between the upper and lower core layers and adjacent to the track width defining portion,
   wherein the upper core layer is provided over the track width defining portion, the first coil layer, and the lower first-coil insulating layer;
   wherein the track width defining portion comprises;
      a lower magnetic pole layer magnetically coupled to the lower core layer;
      an upper magnetic pole layer magnetically coupled to the upper core layer; and
      a gap layer disposed to insulate the upper and lower magnetic pole layers;
      wherein the gap layer is composed of a material selected from the group consisting of NiP, NiPd, NiW, NiMo, NiRh, Au, Pt, Rh, Pd, Ru, and Cr.

3. A thin-film magnetic head comprising:
   a lower core layer;
   an upper core layer magnetically coupled to the lower core layer;
   a track width defining portion disposed between the upper and lower core layers, the track width defining portion defining a track width;
   a first coil layer for inducing recording magnetic fields between the upper and lower core layers, the first coil layer having a spiral conductive pattern with a predetermined number of turns and a space between the turns of the spiral conductive pattern, wherein the first coil layer is provided beneath the track width defining portion in a height direction, wherein an upper face of the first coil layer is aligned in a reference plane defined by an interface between the track width defining portion and the upper core layer;
   a lower first-coil insulating layer disposed in the space between the turns of the spiral conductive pattern of the first coil layer, the lower first-coil insulating layer disposed between the upper and lower core layers and adjacent to the track width defining portion,
   wherein the upper core layer is provided over the track width defining portion, the first coil layer, and the lower first-coil insulating layer;
   wherein the lower core layer has a sloping top surface.

4. A thin-film magnetic head according to claim 3, wherein the lower first-coil insulating layer is composed of at least one of $Al_2O_3$, $SiO_2$, and SiN.

5. A thin-film magnetic head according to claim 3, further comprising an organic insulating layer disposed between the lower core layer and the lower first-coil insulating layer.

6. A thin-film magnetic head according to claim 3, wherein the first coil layer comprises:
a conductive base layer disposed adjacent to the lower core layer; and
a conductive protective layer provided on the conductive layer, the conductive protective layer having an upper surface aligned with the reference plane.

7. A thin-film magnetic head according to claim 6, wherein the conductive protective layer has a thickness of 0.1 μm to 0.5 μm.

8. A thin-film magnetic head according to claim 6,
wherein the conductive base layer comprises at least one first nonmagnetic conductive layer including at least one element of Cu and Au, and
wherein the conductive protective layer comprises at least one second nonmagnetic conductive layer including at least one element selected from the group consisting of Ni, P, Pd, Pt, B, Au, and W.

9. A thin-film magnetic head comprising:
a lower core layer;
an upper core layer magnetically coupled to the lower core layer;
a track width defining portion disposed between the upper and lower core layers, the track width defining portion defining a track width;
a first coil layer for inducing recording magnetic fields between the upper and lower core layers, the first coil layer having a spiral conductive pattern with a predetermined number of turns and a space between the turns of the spiral conductive pattern, wherein the first coil layer is provided beneath the track width defining portion in a height direction, wherein an upper face of the first coil layer is aligned in a reference plane defined by an interface between the track width defining portion and the upper core layer;
a lower first-coil insulating layer disposed in the space between the turns of the spiral conductive pattern of the first coil layer, the lower first-coil insulating layer disposed between the upper and lower core layers and adjacent to the track width defining portion,
wherein the upper core layer is provided over the track width defining portion, the first coil layer, and the lower first-coil insulating layer;
wherein the first coil layer comprises,
a conductive base layer disposed adjacent to the lower core layer; and
a conductive protective layer provided on the conductive layer, the conductive protective layer having an upper surface aligned with the reference plane,
wherein the conductive base layer comprises at least one first nonmagnetic conductive layer including at least one element of Cu and Au, and
wherein the conductive protective layer comprises at least one second nonmagnetic conductive layer including at least one element selected from the group consisting of Ni, P, Pd, Pt, B. Au, and W.

10. A thin-film magnetic head comprising:
a lower core layer;
an upper core layer magnetically coupled to the lower core layer;
a track width defining portion disposed between the upper and lower core layers, the track width defining portion defining a track width;
a first coil layer for inducing recording magnetic fields between the upper and lower core layers, the first coil layer having a spiral conductive pattern with a predetermined number of turns and a space between the turns of the spiral conductive pattern, wherein the first coil layer is provided beneath the track width defining portion in a height direction, wherein an upper face of the first coil layer is aligned in a reference plane defined by an interface between the track width defining portion and the upper core layer;
a lower first-coil insulating layer disposed in the space between the turns of the spiral conductive pattern of the first coil layer, the lower first-coil insulating layer disposed between the upper and lower core layers and adjacent to the track width defining portion; and
an insulating layer disposed on the lower core layer between the track width defining portion and the lower first-coil insulating layer; and
wherein the upper core layer is provided over the track width defining portion, the first coil layer, and the lower first-coil insulating layer;
wherein the track width defining portion comprises a gap layer having a gap depth in the height direction, the gap depth being a predetermined length from a face opposing a recording medium,
wherein the insulating layer defines the gap depth.

11. A thin-film magnetic head according to claim 10,
wherein the track width defining portion further comprises a lower magnetic pole layer and an upper magnetic pole layer,
wherein the insulating layer has a front end with a tilted portion,
wherein the gap layer and the lower magnetic pole layer connect to the front end, and
wherein the upper magnetic pole layer connects to the tilted portion.

12. A thin-film magnetic head according to claim 10, wherein the lower first-coil insulating layer is composed of at least one of $Al_2O_3$, $SiO_2$, and SiN.

13. A thin-film magnetic head according to claim 10, further comprising an organic insulating layer disposed between the lower core layer and the lower first-coil insulating layer.

14. A thin-film magnetic head according to claim 10, wherein the first coil layer comprises:
a conductive base layer disposed adjacent to the lower core layer; and
a conductive protective layer provided on the conductive layer, the conductive protective layer having an upper surface aligned with the reference plane.

15. A thin-film magnetic head according to claim 14, wherein the conductive protective layer has a thickness of 0.1 μm to 0.5 μm.

16. A thin-film magnetic head according to claim 14,
wherein the conductive base layer comprises at least one first nonmagnetic conductive layer including at least one element of Cu and Au, and
wherein the conductive protective layer comprises at least one second nonmagnetic conductive layer including at least one element selected from the group consisting of Ni, P, Pd, Pt, B, Au, and W.

17. A thin-film magnetic head comprising:
a lower core layer;
an upper core layer magnetically coupled to the lower core layer;
a track width defining portion disposed between the upper and lower core layers, the track width defining portion defining a track width;

a first coil layer for inducing recording magnetic fields between the upper and lower core layers, the first coil layer having a spiral conductive pattern with a predetermined number of turns and a space between the turns of the spiral conductive pattern, wherein the first coil layer is provided beneath the track width defining portion in a height direction, wherein an upper face of the first coil layer is aligned in a reference plane defined by an interface between the track width defining portion and the upper core layer;

a lower first-coil insulating layer disposed in the space between the turns of the spiral conductive pattern of the first coil layer, the lower first-coil insulating layer disposed between the upper and lower core layers and adjacent to the track width defining portion; and an insulating layer disposed on the lower core layer between the track width defining portion and the lower first-coil insulating layer, wherein the upper core layer is provided over the track width defining portion, the first coil layer, and the lower first-coil insulating layer, wherein the track width defining portion further comprises a gap layer having a gap depth in the height direction, the gap depth being a predetermined length from a face opposing a recording medium, wherein the insulating layer defines the gap depth, wherein the track width defining portion further comprises a lower magnetic pole layer and an upper magnetic pole layer, wherein the insulating layer has a front end with a tilted portion, wherein the gap layer and the lower magnetic pole layer connect to the front end, wherein the upper magnetic pole layer connects to the tilted portion, and wherein the upper magnetic pole layer is longer in the height direction than the length of the gap depth of the gap layer.

18. A thin-film magnetic head comprising:

a lower core layer;

an upper core layer magnetically coupled to the lower core layer;

a track width defining portion disposed between the upper and lower core layers, the track width defining portion defining a track width;

an insulating underlayer formed on the lower core layer;

a first coil layer for inducing recording magnetic fields between the upper and lower core layers, the first coil layer having a spiral conductive pattern with a predetermined number of turns and a space between the turns of the spiral conductive pattern, wherein the first coil layer is provided adjacent to the insulating underlayer and beneath the track width defining portion in a height direction, wherein an upper face of the first coil layer is aligned in a reference plane defined by an interface between the track width defining portion and the upper core layer;

a lower first-coil insulating layer disposed in the space between the turns of the spiral conductive pattern of the first coil layer, the lower first-coil insulating layer disposed between the upper and lower core layers and adjacent to the track width defining portion, a second coil layer adjacent to the lower first-coil insulating layer, wherein the second coil layer is electrically connected to the first coil layer; and a second coil insulating layer for covering the second coil layer, wherein the upper core layer is provided over the track width defining portion, the second coil layer, and the second-coil insulating layer;

wherein the track width defining portion comprises:

a lower magnetic pole layer magnetically coupled to the lower core layer;

an upper magnetic pole layer magnetically coupled to the upper core layer; and a gap layer disposed to insulate the upper and lower magnetic pole layers.

19. A thin-film magnetic head according to claim 18, wherein the gap layer is composed of a material selected from the group consisting of NiP, NiPd, NiW, NiMo, NiRh, Au, Pt, Rh, Pd, Ru, and Cr.

20. A thin-film magnetic head according to claim 18, further comprising an insulating layer defining a gap depth, the insulating layer disposed on the lower core layer between the track width defining portion and the lower first-coil insulating layer.

21. A thin-film magnetic head according to claim 20, wherein the insulating layer has a front end with a tilted portion, the gap layer extending to the front end, the upper magnetic pole layer extending to the tilted portion.

22. A thin-film magnetic head according to claim 18, wherein the lower first-coil insulating material exposes the upper face of the lower coil layer, and wherein an upper first-coil insulating material covers the upper face.

23. A thin-film magnetic head according to claim 18, wherein the lower first-coil insulating layer is composed of at least one of $Al_2O_3$, $SiO_2$, and SiN.

24. A thin-film magnetic head according to claim 18 further comprising an organic insulating layer disposed between the lower core layer and the lower first-coil insulating layer.

25. A thin-film magnetic head according to claim 18, wherein the first coil layer comprises, a first conductive base layer disposed adjacent to the insulating underlayer, and a first conductive protective layer provided on the first conductive base layer, the first conductive protective layer having an upper surface aligned with the reference plane, and wherein the second coil layer comprises, a second conductive base layer, and a second conductive protective layer provided on the second conductive base layer.

26. A thin-film magnetic head according to claim 25, wherein the first conductive base layer comprises at least one first nonmagnetic conductive layer and the second conductive base layer comprises at least one second nonmagnetic conductive layer, the first and second nonmagnetic conductive layers including at least one element of Cu and Au, and wherein the first conductive protective layer comprises at least one third nonmagnetic conductive layer and the second conductive protective layer comprises at least one fourth nonmagnetic conductive layer, the third and fourth nonmagnetic conductive layers including at least one element selected from the group consisting of Ni, P, Pd, Pt, B, Au, and W.

27. A thin-film magnetic head comprising:

a lower core layer;

an upper core layer magnetically coupled to the lower core layer;

a track width defining portion disposed between the upper and lower core layers, the track width defining portion defining a track width;

an insulating underlayer formed on the lower core layer;

a first coil layer for inducing recording magnetic fields between the upper and lower core layers, the first coil layer having a spiral conductive pattern with a predetermined number of turns and a space between the turns of the spiral conductive pattern, wherein the first coil layer is provided adjacent to the insulating underlayer and beneath the track width defining portion in a height direction, wherein an upper face of the first coil layer is aligned in a reference plane defined by an interface between the track width defining portion and the upper core layer;

a lower first-coil insulating layer disposed in the space between the turns of the spiral conductive pattern of the first coil layer, the lower first-coil insulating layer disposed between the upper and lower core layers and adjacent to the track width defining portion, a second coil layer adjacent to the lower first-coil insulating layer, wherein the second coil layer is electrically connected to the first coil layer; and a second coil insulating layer for covering the second coil layer;

wherein the upper core layer is provided over the track width defining portion, the second coil layer, and the second-coil insulating layer;

wherein the lower core layer has a sloping top surface.

28. A thin-film magnetic head according to claim 27, wherein the lower first-coil insulating material exposes the upper face of the lower coil layer, and wherein an upper first-coil insulating material covers the upper face.

29. A thin-film magnetic head according to claim 27, wherein the lower first-coil insulating layer is composed of at least one of $Al_2O_3$, $SiO_2$, and SiN.

30. A thin-film magnetic head according to claim 27, further comprising an organic insulating layer disposed between the lower core layer and the lower first-coil insulating layer.

31. A thin-film magnetic head according to claim 27,
wherein the first coil layer comprises,
a first conductive base layer disposed adjacent to the insulating underlayer, and
a first conductive protective layer provided on the first conductive base layer, the first conductive protective layer having an upper surface aligned with the reference plane, and
wherein the second coil layer comprises,
a second conductive base layer, and
a second conductive protective layer provided on the second conductive base layer.

32. A thin-film magnetic head according to claim 31,
wherein the first conductive base layer comprises at least one first nonmagnetic conductive layer and the second conductive base layer comprises at least one second nonmagnetic conductive layer, the first and second nonmagnetic conductive layers including at least one element of Cu and Au, and
wherein the first conductive protective layer comprises at least one third nonmagnetic conductive layer and the second conductive protective layer comprises at least one fourth nonmagnetic conductive layer, the third and fourth nonmagnetic conductive layers including at least one element selected from the group consisting of Ni, P, Pd, Pt, B, Au, and W.

33. A thin-film magnetic head comprising:

a lower core layer;

an upper core layer magnetically coupled to the lower core layer;

a track width defining portion disposed between the upper and lower core layers, the track width defining portion defining a track width;

an insulating underlayer formed on the lower core layer;

a first coil layer for inducing recording magnetic fields between the upper and lower core layers, the first coil layer having a spiral conductive pattern with a predetermined number of turns and a space between the turns of the spiral conductive pattern, wherein the first coil layer is provided adjacent to the insulating underlayer and beneath the track width defining portion in a height direction, wherein an upper face of the first coil layer is aligned in a reference plane defined by an interface between the track width defining portion and the upper core layer;

a lower first-coil insulating layer disposed in the space between the turns of the spiral conductive pattern of the first coil layer, the lower first-coil insulating layer disposed between the upper and lower core layers and adjacent to the track width defining portion, a second coil layer adjacent to the lower first-coil insulating layer, wherein the second coil layer is electrically connected to the first coil layer; and a second coil insulating layer for covering the second coil layer, wherein the upper core layer is provided over the track width defining portion, the second coil layer, and the second-coil insulating layer.

wherein the first coil layer comprises,
a first conductive base layer disposed adjacent to the insulating underlayer, and
a first conductive protective layer provided on the first conductive base layer, the first conductive protective layer having an upper surface aligned with the reference plane, and wherein the second coil layer comprises,
a second conductive base layer, and
a second conductive protective layer provided on the second conductive base layer, wherein the first conductive base layer comprises at least one first nonmagnetic conductive layer and the second conductive base layer comprises at least one second nonmagnetic conductive layer, the first and second nonmagnetic conductive layers including at least one element of Cu and Au, and wherein the first conductive protective layer comprises at least one third nonmagnetic conductive layer and the second conductive protective layer comprises at least one fourth nonmagnetic conductive layer, the third and fourth nonmagnetic conductive layers including at least one element selected from the group consisting of Ni, P, Pd, Pt, B. Au, and W.

34. A thin-film magnetic head comprising:

a lower core layer having a lower magnetic pole layer thereon;

an upper core layer having an upper magnetic pole layer thereunder and a base portion;

a track width defining portion for defining a size in a track width direction disposed between the lower core layer and the upper core layer at a face opposing a recording medium; and a first coil layer for inducing recording magnetic fields between the lower core layer and the upper core layer, the first coil layer having a spiral conductive pattern with a predetermined number of turns;

wherein the track width defining portion includes at least one of the lower magnetic pole layer in contact with the lower core layer and the upper core layer in contact with the upper core layer, together with a gap layer provided between the lower core layer and the upper core layer for insulating the lower core layer and the upper core layer;

wherein the first coil layer is provided behind the track width defining portion in a height direction, wherein an upper face of the first coil layer is aligned in a reference plane defined by an interface between the track width defining portion and the upper core layer;

wherein a space between turns of the spiral conductive pattern of the first coil layer is filled with a lower first-coil insulating layer, and an upper first-coil insulating layer is formed on the first coil layer; and wherein the upper core layer is provided over the track width defining portion and the upper first-coil insulating layer, and the base portion of the upper core layer is magnetically coupled to the lower core layer; and wherein the first coil layer comprises a conductive base layer and a conductive protective layer provided thereon, and the conductive protective layer having a top surface aligned in the reference plane.

35. A thin-film magnetic head according to claim 34, wherein the conductive base layer comprises at least one first nonmagnetic conductive layer including at least one element of Cu and Au, and the conductive protective layer comprises at least one second nonmagnetic conductive layer including at least one element selected from the group consisting of Ni, P, Pd, Pt, B, Au, and W.

36. A thin-film magnetic head according to claim 34, wherein the lower first-coil insulating layer comprises an inorganic material.

37. A thin-film magnetic head comprising:
a lower core layer having a lower magnetic pole layer thereon;
an upper core layer having an upper magnetic pole layer thereunder and a base portion;
a track width defining portion for defining a size in a track width direction disposed between the lower core layer and the upper core layer at a face opposing a recording medium;
a first coil layer for inducing recording magnetic fields between the lower core layer and the upper core layer, the first coil layer having a spiral conductive pattern with a predetermined number of turns;
a second coil layer on the upper first-coil insulating layer; and
a second-coil insulating layer for covering the second coil layer;

wherein the track width defining portion includes at least one of the lower magnetic pole layer in contact with the lower core layer and the upper core layer in contact with the upper core layer, together with a gap layer provided between the lower core layer and the upper core layer for insulating the lower core layer and the upper core layer;

wherein the first coil layer is provided behind the track width defining portion in a height direction, wherein an upper face of the first coil layer is aligned in a reference plane defined by an interface between the track width defining portion and the upper core layer;

wherein a space between turns of the spiral conductive pattern of the first coil layer is filled with a lower first-coil insulating layer, and an upper first-coil insulating layer is formed on the first coil layer; and wherein the upper core layer is provided over the track width defining portion and the upper first-coil insulating layer, and the base portion of the upper core layer is magnetically coupled to the lower core layer;

wherein the second coil layer is electrically connected to the first coil layer, wherein the upper core layer is formed over the track width defining portion and the second-coil insulating layer.

38. A thin-film magnetic head according to claim 37, wherein an upper surface of a first coil center of the first coil layer is aligned in the reference plane and the first coil center of the first coil layer is electrically connected to a second coil center of the second coil layer.

39. A thin-film magnetic head comprising:
a lower core layer having a lower magnetic pole layer thereon;
an upper core layer having an upper magnetic pole layer thereunder and a base portion;
a track width defining portion for defining a size in a track width direction disposed between the lower core layer and the upper core layer at a face opposing a recording medium; and
a first coil layer for inducing recording magnetic fields between the lower core layer and the upper core layer, the first coil layer having a spiral conductive pattern with a predetermined number of turns;

wherein the track width defining portion includes at least one of the lower magnetic pole layer in contact with the lower core layer and the upper core layer in contact with the upper core layer, together with a gap layer provided between the lower core layer and the upper core layer for insulating the lower core layer and the upper core layer;

wherein the first coil layer is provided behind the track width defining portion in a height direction, wherein an upper face of the first coil layer is aligned in a reference plane defined by an interface between the track width defining portion and the upper core layer;

wherein a space between turns of the spiral conductive pattern of the first coil layer is filled with a lower first-coil insulating layer, and an upper first-coil insulating layer is formed on the first coil layer;

wherein the upper core layer is provided over the track width defining portion and the upper first-coil insulating layer, and the base portion of the upper core layer is magnetically coupled to the lower core layer; and wherein the gap layer comprises a nonmagnetic metal material formable by plating.

40. A thin-film magnetic head according to claim 39, wherein the nonmagnetic metal material comprises at least one material selected from the group consisting of NiP, NiPd, NiW, NiMo, NiRh, Au, Pt, Rh, Pd, Ru, and Cr.

41. A thin-film magnetic head according to claim 39, wherein the first coil layer comprises a conductive base layer and a conductive protective layer provided thereon, and the conductive protective layer having a top surface aligned in the reference plane.

42. A thin-film magnetic head according to claim 41, wherein the conductive base layer comprises at least one first nonmagnetic conductive layer including at least one element of Cu and Au, and the conductive protective layer comprises at least one second nonmagnetic conductive layer including at least one element selected from the group consisting of Ni, P, Pd, Pt, B, Au, and W.

43. A thin-film magnetic head according to claim 39, wherein the lower first-coil insulating layer comprises an inorganic material.

* * * * *